US012508522B2

United States Patent
Kis et al.

(10) Patent No.: US 12,508,522 B2
(45) Date of Patent: Dec. 30, 2025

(54) DEAERATION TANK

(71) Applicant: Modine Manufacturing Company, Racine, WI (US)

(72) Inventors: Michael J. Kis, Sturtevant, WI (US); Timothy R. Luttig, Franklin, WI (US); Zachary J. Fleischmann, Waterford, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 575 days.

(21) Appl. No.: 17/945,288

(22) Filed: Sep. 15, 2022

(65) Prior Publication Data

US 2024/0091672 A1 Mar. 21, 2024

(51) Int. Cl.
  B01D 19/00 (2006.01)
  F01P 11/02 (2006.01)

(52) U.S. Cl.
  CPC ........ B01D 19/0031 (2013.01); F01P 11/028 (2013.01)

(58) Field of Classification Search
  CPC .................... B01D 19/0031; F01P 11/028
  USPC ........................................................ 96/219
  See application file for complete search history.

(56) References Cited

U.S. PATENT DOCUMENTS

| | | | |
|---|---|---|---|
| 4,428,418 A * | 1/1984 | Beasley | F28F 1/32 165/182 |
| 5,167,274 A * | 12/1992 | Mueller | B01J 8/12 165/47 |
| 5,983,997 A | 11/1999 | Hou | |
| 9,895,957 B2 | 2/2018 | Eckert et al. | |
| 2005/0066812 A1 | 3/2005 | Vesper et al. | |
| 2006/0002088 A1 | 1/2006 | Bezama et al. | |
| 2007/0215073 A1 * | 9/2007 | Lawrence | F01P 11/028 123/41.54 |

(Continued)

FOREIGN PATENT DOCUMENTS

| CN | 2696126 Y | 4/2005 |
|---|---|---|
| CN | 2842735 Y | 11/2006 |

(Continued)

OTHER PUBLICATIONS

Shi, J.-y., et al. "Effect of inlet manifold structure on the performance of the heater core in the automobile air-conditioning systems." Applied thermal engineering 30.8-9 (2010): 1016-1021.

(Continued)

*Primary Examiner* — T. Bennett Mckenzie
(74) *Attorney, Agent, or Firm* — Michael Best & Friedrich LLP

(57) ABSTRACT

A deaeration tank includes a top wall, a bottom wall, a first side wall, a second side wall, a cavity, a fluid inlet, a fluid outlet, and a plurality of support members. The cavity is defined between the top wall, the bottom wall, the first side wall, and the second side wall. The cavity provides a path for fluid to flow between the fluid inlet and the fluid outlet. Each of the plurality of support members includes a first segment and a second segment. The first segment extends from the first side wall to the second side wall. The second segment extends perpendicularly from the first segment toward the bottom wall such that the support members are configured to direct fluid flowing within the cavity away from the top wall.

20 Claims, 26 Drawing Sheets

(56) References Cited

U.S. PATENT DOCUMENTS

| | | | |
|---|---|---|---|
| 2009/0263114 A1 | 10/2009 | Wu | |
| 2010/0031901 A1* | 2/2010 | Dahl | F01P 11/028 123/41.05 |
| 2012/0037606 A1 | 2/2012 | Huang et al. | |
| 2015/0096718 A1* | 4/2015 | Noel-Baron | F28F 17/005 165/166 |
| 2022/0341360 A1* | 10/2022 | Barbolini | F01P 11/029 |

FOREIGN PATENT DOCUMENTS

| | | | | |
|---|---|---|---|---|
| CN | 111536690 A | | 8/2020 | |
| CN | 112895846 B | | 4/2022 | |
| EP | 1475579 A2 | | 11/2004 | |
| FR | 2706531 A1 | * | 12/1994 | ............ F01P 11/028 |
| FR | 2943296 A1 | | 3/2009 | |
| GB | 1569779 A | | 1/2011 | |
| JP | H11135241 A | | 4/2003 | |
| KR | 20110007542 A | | 6/1980 | |
| KR | 20040048133 A | | 6/2004 | |
| KR | 20110058328 A | | 6/2011 | |
| WO | 2010069355 A1 | | 6/2010 | |

OTHER PUBLICATIONS

Musat, R. et al. "Characteristics of the PTC heater used in automotive HVAC systems." Doctoral Conference on Computing, Electrical and Industrial Systems. Springer, Berlin, Heidelberg, 2010 (8 pages).

Shah, R. K. "Advances in automotive heat exchanger technology." SAE transactions (2003): 631-641.

International Search Report and Written Opinion for Application No. PCT/US2023/032910 dated Dec. 8, 2023 (15 pages).

International Preliminary Report on Patentability for PCT/US2023/032910 dated Mar. 1, 2025 (9 pages).

* cited by examiner

DEAERATION TANK

FIELD OF THE INVENTION

The present disclosure relates to deaeration tanks, and more specifically, to deaeration tanks in conjunction with cooling systems to regulate engine temperatures.

SUMMARY

In one aspect, the disclosure provides a deaeration tank configured to de-aerate coolant fluid for an electric vehicle. The deaeration tank includes a housing and a filter. The housing includes a first portion, a second portion, and a fluid flow path. The first portion has a first cavity, a plurality of first portion support members, and a baffle that divides the first cavity into an inlet chamber and an outlet chamber. The second portion has a second cavity and a plurality of second portion support members. The fluid flow path extends from the inlet chamber to the second cavity and from the second cavity to the outlet chamber. The filter extends along an interface between the first portion and the second portion. The filter separates the second cavity from the inlet chamber such that the fluid flow path passes through the filter a first time, and separates the second cavity from the outlet chamber such that the fluid flow path passes through the filter a second time. The first portion is joined to the second portion such that ends of first portion support members are joined with ends of the second portion support members.

In another aspect, the disclosure provides a deaeration tank configured to de-aerate coolant fluid for an electric vehicle. The deaeration tank includes a top wall, a bottom wall, a first side wall, a second side wall, a cavity, a fluid inlet, a fluid outlet, and a plurality of support members. The first side wall extends between the top wall and the bottom wall. The second side all extends between the top wall and the bottom wall opposite from the first side wall. The cavity is defined between the top wall, the bottom wall, the first side wall, and the second side wall. The fluid inlet is positioned closer to the bottom wall than the top wall. The fluid inlet provides an entrance for fluid to flow into the cavity. The fluid outlet is positioned closer to the bottom wall than the top wall. The fluid outlet provides an exit for fluid to flow out of the cavity such that the cavity provides a path for fluid to flow between the fluid inlet and the fluid outlet. Each of the plurality of support members includes a first segment and a second segment. The first segment extends from the first side wall to the second side wall. The second segment extends perpendicularly from the first segment toward the bottom wall such that the support members are configured to direct fluid flowing within the cavity away from the top wall.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
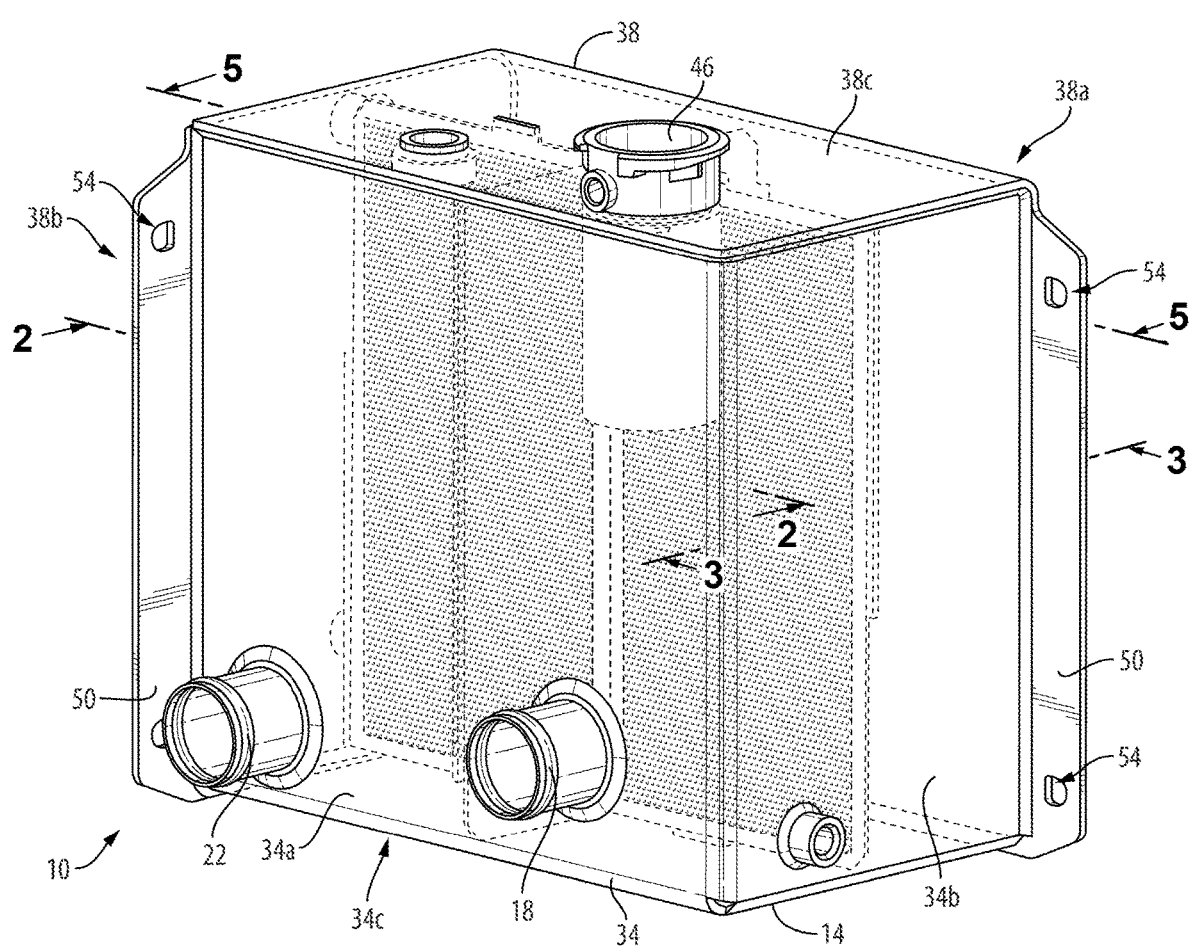
FIG. 1 is a right-side perspective view of a deaeration tank according to an embodiment of the disclosure.
Figure 2:
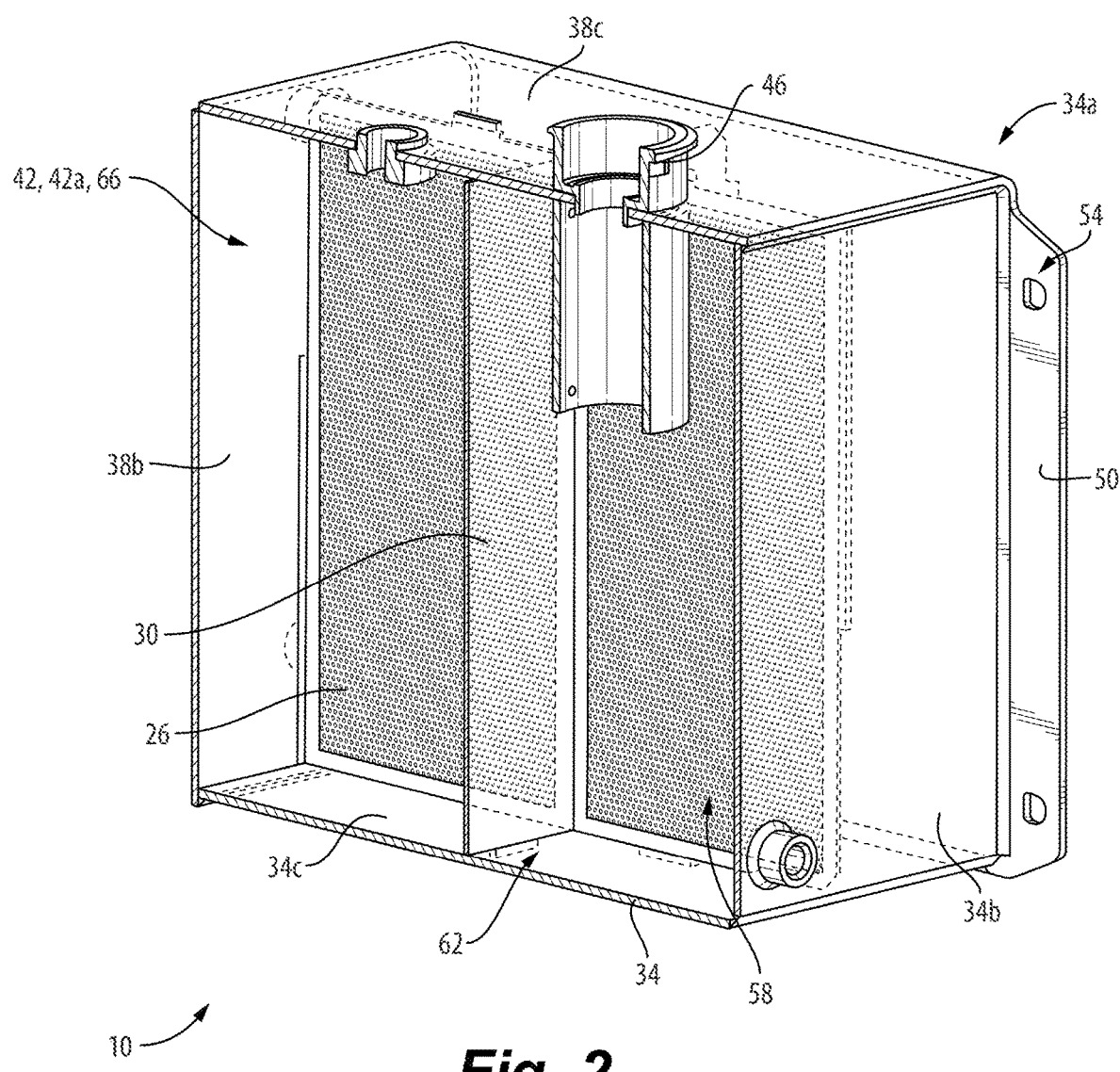
FIG. 2 is a section view of the deaeration tank of FIG. 1 taken along line 2-2.

FIG. 1 illustrates a deaeration tank 10 operable to provide coolant to an engine. The deaeration tank 10, as described with respect to FIGS. 1-5, is generally known in the art. The deaeration tank 10 includes an outer housing 14, an inlet tube 18, an outlet tube 22, a filter 26 (FIG. 2), and a baffle 30 (FIG. 2). The deaeration tank 10 may be connected to an engine to provide de-aeration for coolant flowing between the inlet tube 18 and the outlet tube 22. The engine may be an internal combustion engine or an electric motor. The electric motor may power, for example, an electric vehicle. The deaeration tank 10 may also be used conjunction with battery cells to provide coolant thereto. The deaeration tank 10 may aid in inhibiting engine or battery damage by de-aerating the coolant flowing therethrough.

With continued reference to FIG. 1, the outer housing 14 includes a first portion 34 and a second portion 38. Each of the first portion 34 and the second portion 38 form three faces of a rectangular prism. More specifically, the first portion 34 includes a front face 34a, a side face 34b, and a bottom face 34c. The second portion 38 includes a rear face 38a, a side face 38b, and a top face 38c. The rear face 38a is positioned opposite from the front face 34a on the rectangular prism. The side face 38b of the second portion 38 is positioned opposite from the side face 34b of the first portion 34. The top face 38c is positioned opposite from the bottom face 34c on the rectangular prism. The first portion 34 and the second portion 38 are joined to define an internal cavity 42 between the first portion 34 and the second portion 38. The front face 34a of the first portion 34 includes the inlet tube 18 and the outlet tube 22. The second portion 38 includes a manual pour tube 46 that extends through the top face 38c. The second portion 38 further includes flanges 50 extending away from the deaeration tank 10 from the rear face 38a of the second portion 38 and the side face 38b of the second portion 38. The flanges 50 include fastener receiving apertures 54 that may receive fasteners to couple the deaeration tank 10 to an engine or vehicle.

As illustrated in FIG. 2, the filter 26 is a perforated screen including a plurality of apertures 56 extending therethrough. The apertures 56 are operable to separate air (i.e., de-aerate) from coolant flowing through the filter 26. The filter 26 extends between the side face 34b of the first portion 34 and the side face 38b of the second portion 38. In the illustrated embodiment, the filter 26 extends perpendicularly between the side face 34b of the first portion 34 and the side face 38b of the second portion 38. The filter 26 additionally extends from the bottom face 34c of the first portion 34 to the top face 38c of the second portion 38 such that the filter 26 divides the internal cavity 42 into a forward internal cavity 42a and a rear internal cavity 42b. In other embodiments, the filter 26 may extend in a direction that is not perpendicular to the side face 34b of the first portion 34 and the side face 38b of the second portion 38. For example, the filter 26 may extend at an acute angle relative to the side face 34b of the first portion 34 and the side face 38b of the second portion 38.

Figure 3:
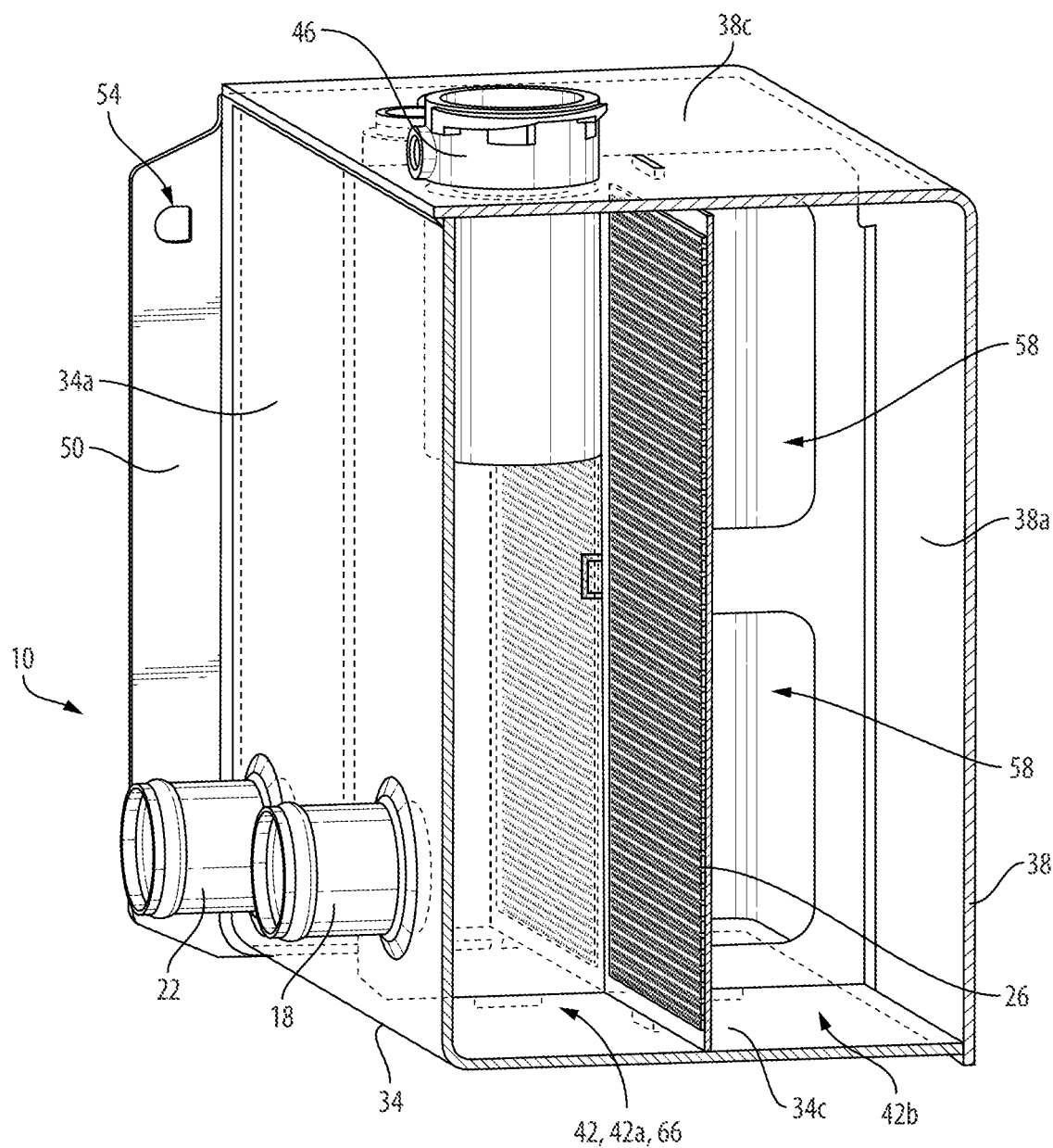
FIG. 3 is a section view of the deaeration tank of FIG. 1 taken along line 3-3.

Turning reference to FIG. 3, in the illustrated embodiment, the baffle 30 is a panel including two baffle apertures 58. The baffle 30 extends between the front face 34a of the first portion 34 and the rear face 38a of the second portion 38. In the illustrated embodiment, the baffle 30 extends perpendicularly between the front face 34a of the first portion 34 and the rear face 38a of the second portion 38. The baffle 30 additionally extends from the bottom face 34c of the first portion 34 to the top face 38c of the second portion 38 such that the baffle 30 further divides the forward internal cavity 42a into an inlet chamber 62 and an outlet chamber 66, as best illustrated in FIG. 2. The two baffle apertures 58 are positioned on a portion of the baffle 30 within the rear internal cavity 42b and allow fluid to flow therethrough. In other embodiments, the baffle 30 may extend in a direction that is not perpendicular to the front face 34a of the first portion 34 and the rear face 38a of the second portion 38. For example, the baffle 30 may extend at an acute angle relative to the front face 34a of the first portion 34 and the rear face 38a of the second portion 38.

Returning reference to FIG. 3, the filter 26 further includes a plurality of filter tabs 70, and the baffle 30 further includes a plurality of baffle tabs 74. The filter tabs 70 may extend from the filter 26 through the side face 34b of the first portion 39, through the bottom face 34c of the first portion 34, through the side face 38b of the second portion 38, and through the top face 38c of the second portion 38. The filter tabs 70 are operable to secure the filter 26 to the deaeration tank 10. The baffle tabs 74 may extend from the baffle 30 through the front face 34a of the first portion 34, through the bottom face 34c of the first portion 34, through the rear face 38a of the second portion 38, and through the top face 38c of the second portion 38.

Figure 4:
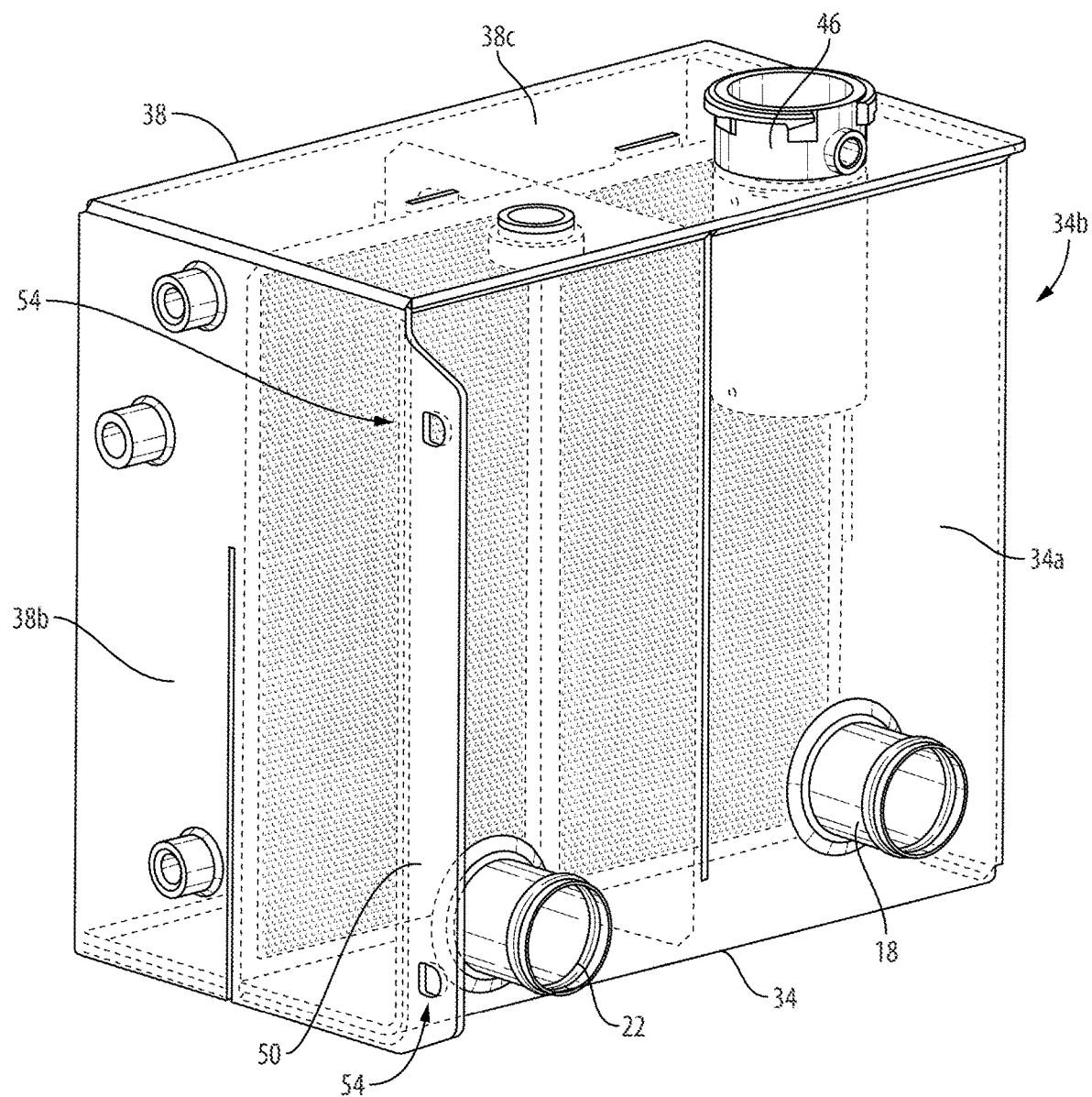
FIG. 4 is a left-side perspective view of the deaeration tank of FIG. 1.

With reference to FIGS. 2 and 4, in the illustrated embodiment, the first portion 34 and the second portion 38 of the deaeration tank 10 may be manufactured through any combination of metal forming processes such as stamping, rolling, injection molding, or another similar metal forming process. Each face 34a-34c of the first portion 34 is formed separately from the other faces 34a-34c of the first portion 34. The faces 34a-34c of the first portion 34 are then joined together to create the first portion 34. Each face 38a-38c of the second portion 38 is formed separately from the other faces 38a-38c of the second portion 38. The faces 38a-38c of the second portion 38 are then joined together to create the second portion 38. The filter 26 and the baffle 30 are then placed in a desired orientation as described above, and the first portion 34 is joined to the second portion 38 to form the deaeration tank 10.

Figure 5:
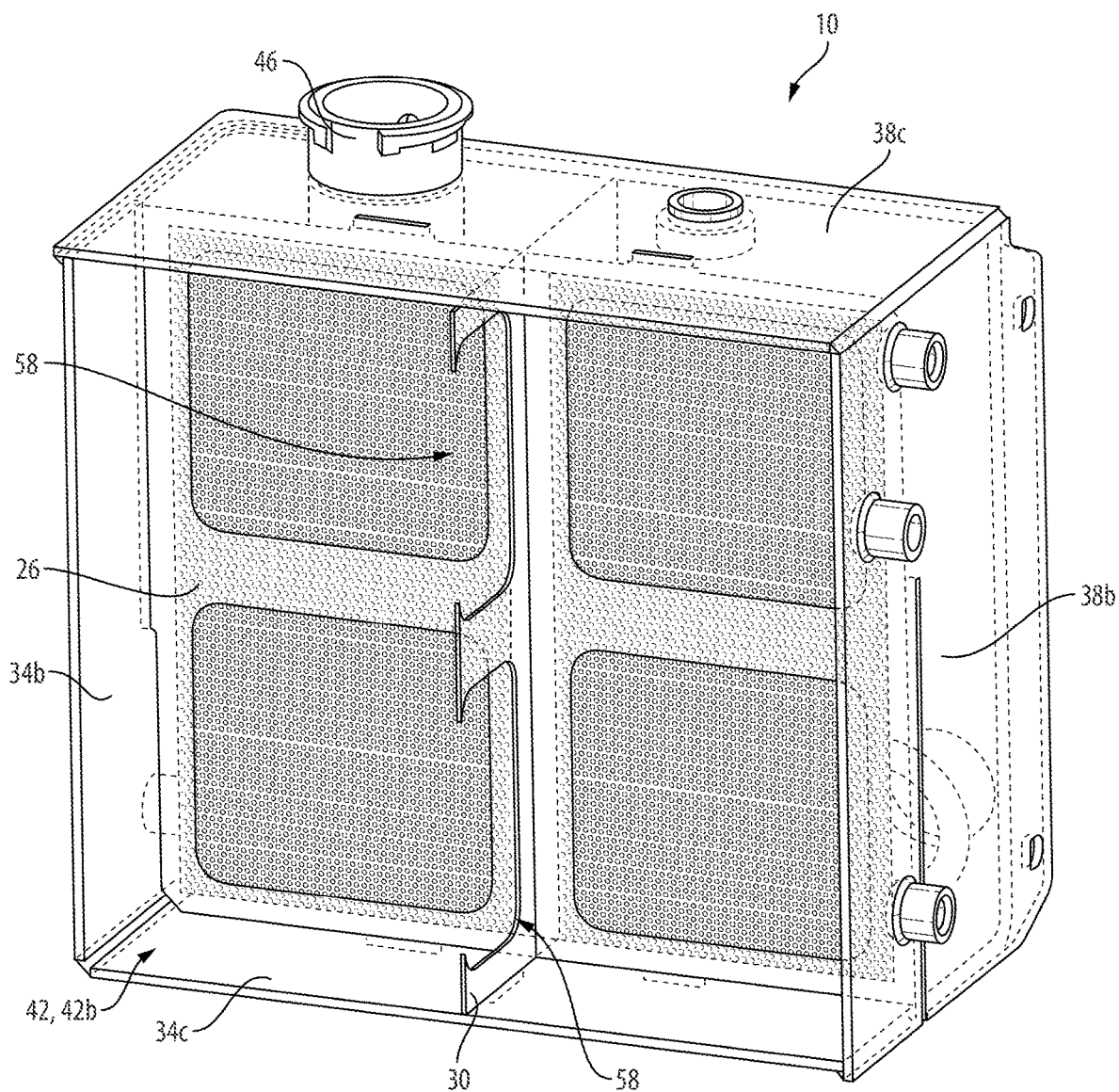
FIG. 5 is a section view of the deaeration tank of FIG. 1 taken along line 5-5.

Turning reference to FIGS. 2 and 5, in operation, the deaeration tank 10 may be fluidly connected to an engine. Additionally, the flanges 50 may receive fasteners in the fastener receiving apertures 54 to secure the deaeration tank 10 adjacent the engine. A user may fill the deaeration tank 10 through the manual pour tube 46. The baffle 30 inhibits the coolant from flowing directly from the inlet chamber 62 to the outlet chamber 66 without first passing through the filter 26. In operation of the engine or battery connected to the coolant tank 10, the coolant is directed to flow from the inlet chamber 62 to the rear internal cavity 42b through the filter 26, thereby de-aerating the coolant. The coolant then flows across the rear internal cavity 42b through the two baffle apertures 58. Once the fluid has crossed the baffle 30, the fluid is then directed to flow from the rear internal cavity 42b to the outlet chamber 66 through the filter 26, thereby de-aerating the coolant again. The coolant then flows out of the outlet tube 22 to the engine to more effectively cool down the engine or battery fluidly connected to the deaeration tank 10.

Figure 6:
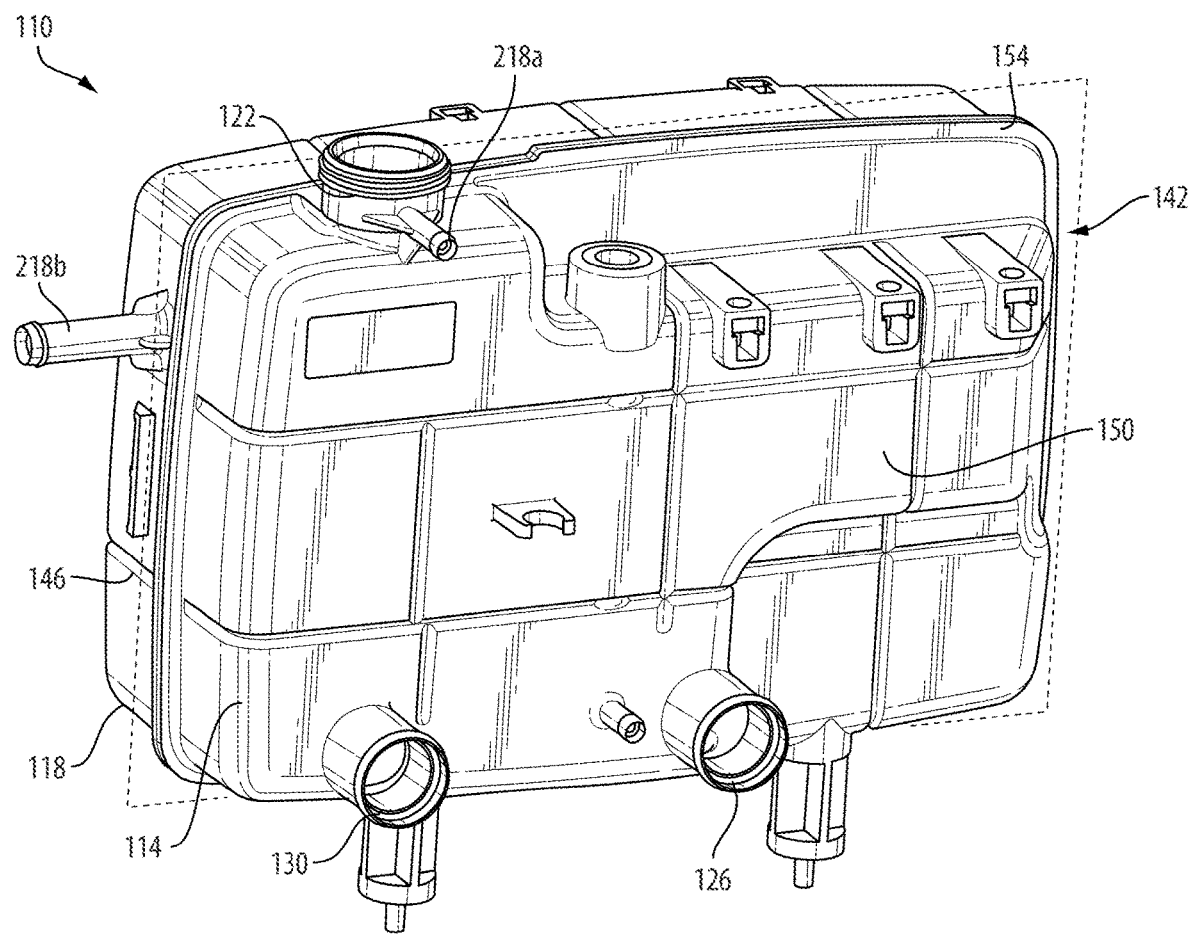
FIG. 6 is a front perspective view of a deaeration tank according to another embodiment of the disclosure.
Figure 7:
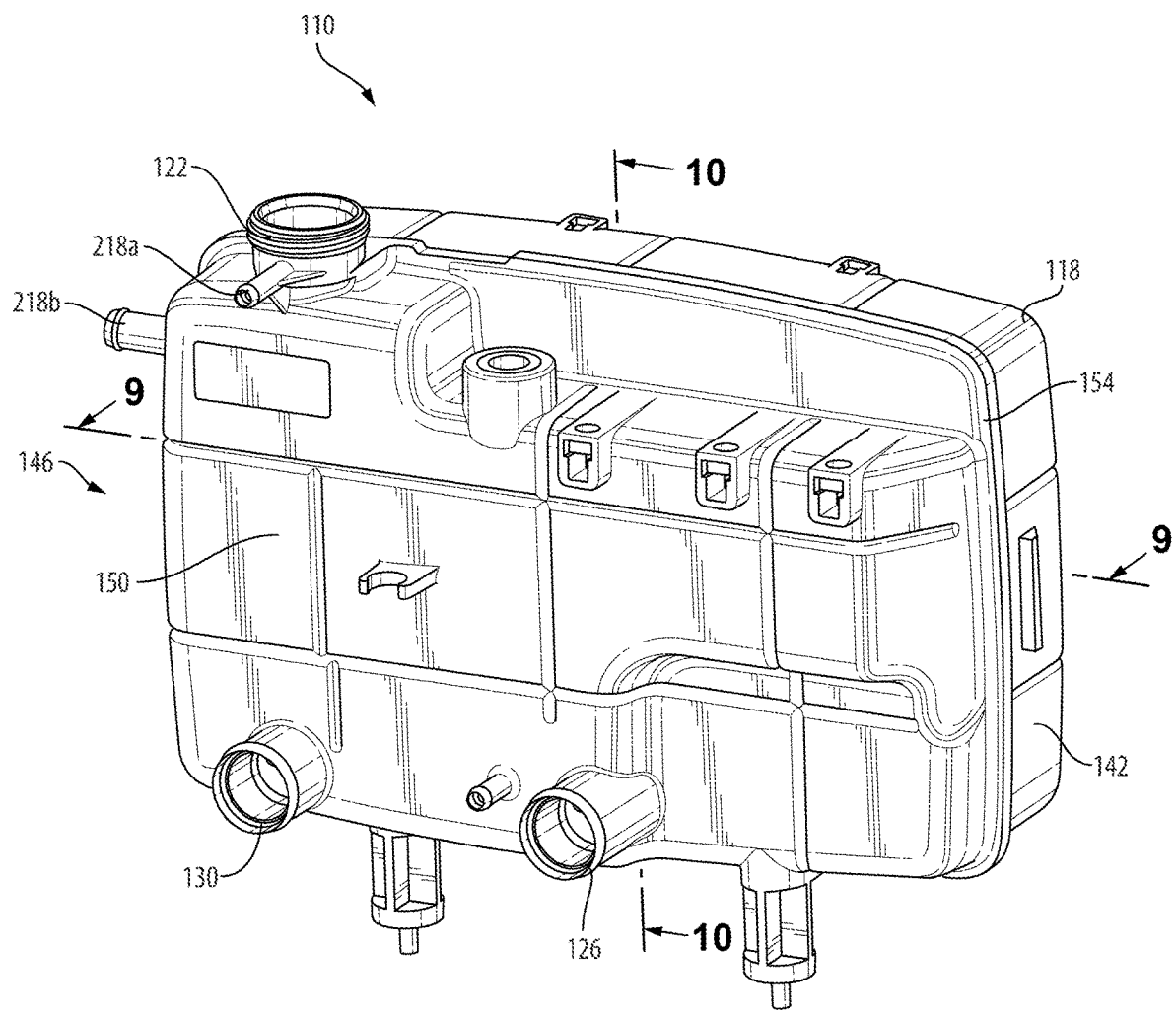
FIG. 7 is another front perspective view of the deaeration tank of FIG. 6.
Figure 9:
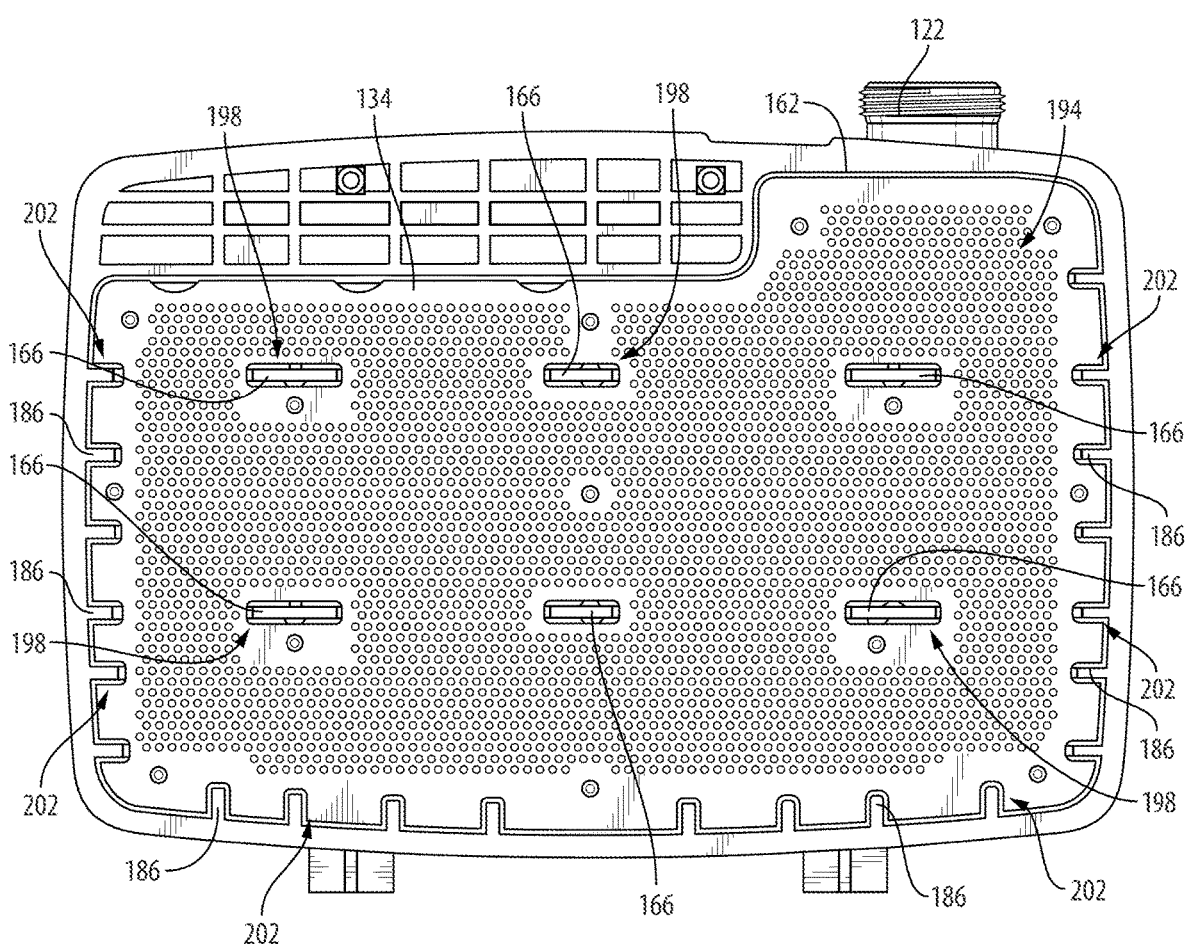
FIG. 9 is a section view of the deaeration tank of FIG. 8 taken along line 9-9.
Figure 10:
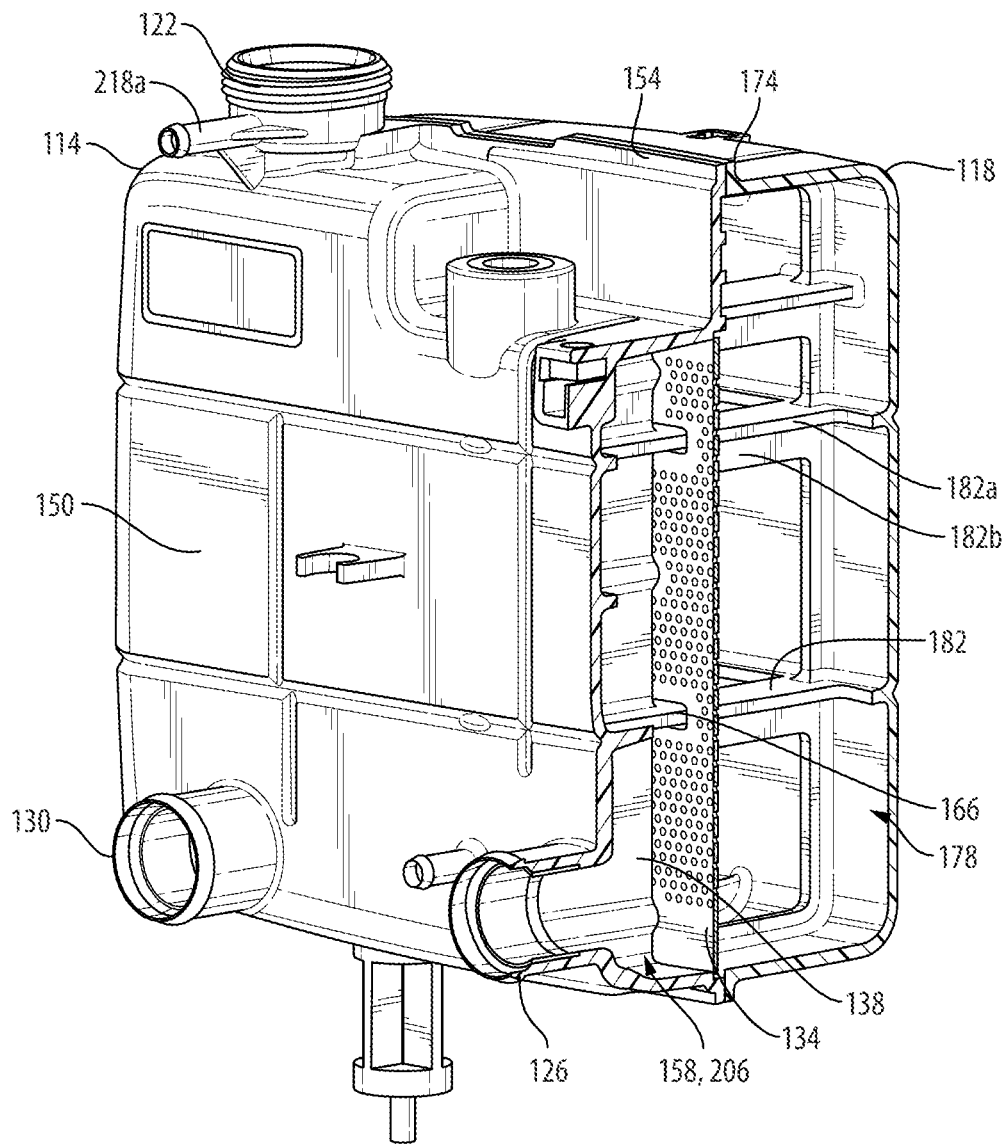
FIG. 10 is a section view of the deaeration tank of FIG. 7 taken along line 10-10.

FIGS. 6 and 7 illustrate another embodiment of a deaeration tank 110. The deaeration tank 110 includes a first portion 114, a second portion 118, a manual pour tube 122, an inlet tube 126, an outlet tube 130, a filter 134 (FIG. 9), and a baffle 138 (FIG. 10). Each of the first portion 114 and the second portion 118 is formed of plastic. More specifically, each of the first portion 114 and the second portion 118 is formed of plastic through injection molding. The first portion 114 is joined to the second portion 118. In the illustrated embodiment, the first portion 114 and the second portion 118 are joined together through hot plate welding which will be described in more detail below. In other embodiments, the first portion 114 and the second portion 118 could be joined together through manufacturing processes such as, but not limited to, gluing, ultrasonic welding, friction welding, solvent welding and the like. Through the joining process, the second portion 118 is fixed to the first portion 114. The deaeration tank 110 may be connected to an engine to provide de-aeration for coolant flowing between the inlet tube 126 and the outlet tube 130. The inlet tube 126 may also be referred to as a fluid inlet. The outlet tube 130 may also be referred to as a fluid outlet. The deaeration tank 110 of FIG. 6 is operable to remove air from coolant more efficiently than the deaeration tank 10 of FIG. 1, as will be described in more detail below.

Figure 8:
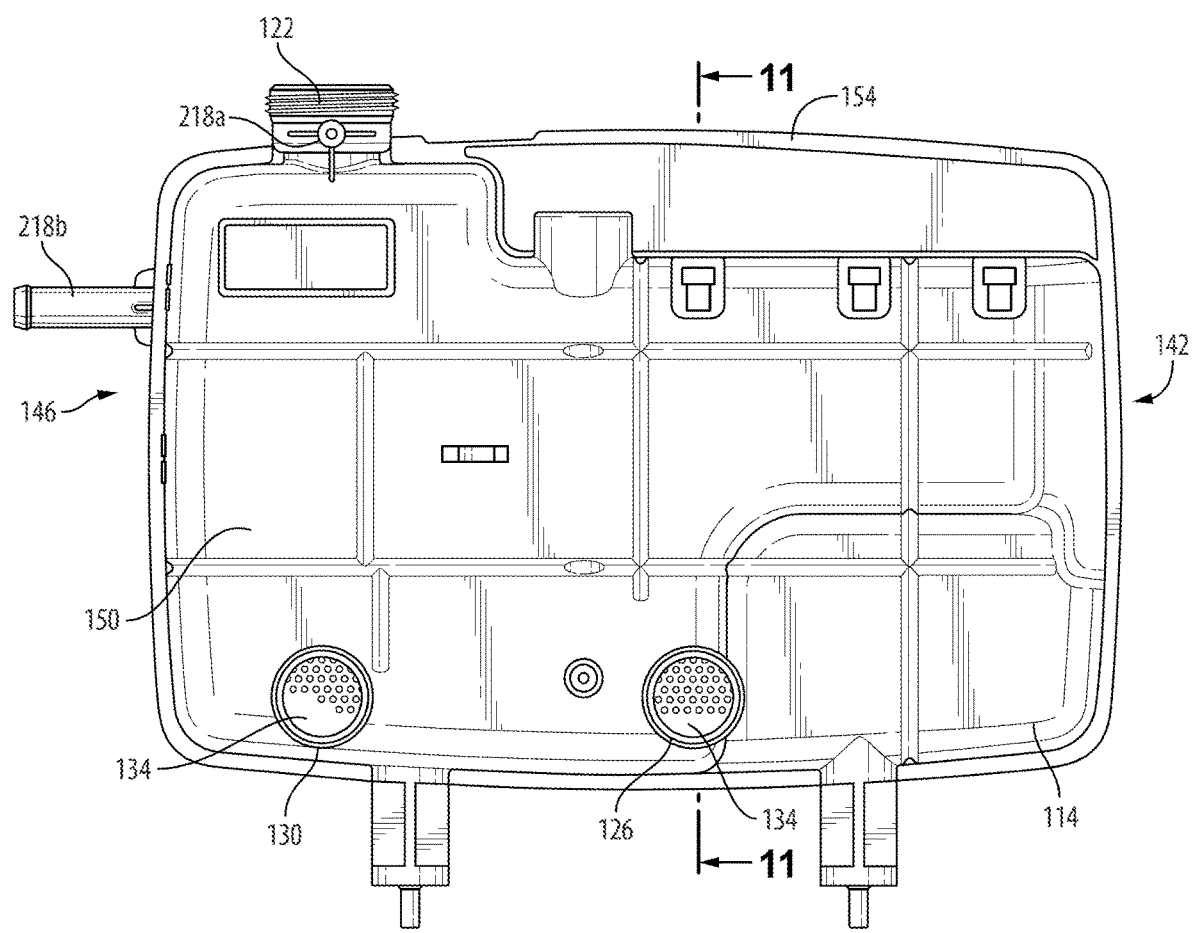
FIG. 8 is a front view of the deaeration tank of FIG. 6.

With continued reference to FIGS. 6 and 7, in the illustrated embodiment, each of the manual pour tube 122, the inlet tube 126, and the outlet tube 130 are integrally formed with the first portion 114 of the deaeration tank 110. In other embodiments, any combination of the manual pour tube 122, the inlet tube 126, and the outlet tube 130 may be formed as a separate component from the first portion 114. In an upright position, as illustrated in FIG. 8, the inlet tube 126 and the outlet tube 130 are positioned closer to a bottom wall 139 of the deaeration tank 110 than a top wall 141 of the deaeration tank 110. The manual pour tube 122 extends from the top wall 141 of the deaeration tank 110. The bottom wall 139 may be considered a first surface, and the top wall 141 may be considered a second surface. The deaeration tank 110 additionally includes a first side 142 and a second side 146. The first side 142 and the second side 146 extend between the top wall 141 and the bottom wall 139 of the deaeration tank 110. The inlet tube 126 is positioned closer to the first side 142 than the second side 146. The outlet tube 130 is positioned closer to the second side 146 than the first side 142 such that the outlet tube 130 is positioned between the inlet tube 126 and the second side 146 of the deaeration tank 110. The manual pour tube 122 is positioned closer to the second side 146 than the first side 142 such that the manual pour tube 122 is positioned between the inlet tube 126 and the second side 146.

With reference to FIG. 10, the first portion 114 of the deaeration tank 110 includes a first side wall 150 and a first outer periphery 154 that defines a first portion joining plane A1. The first side wall 150 is spaced from the first outer periphery 154, thereby defining a first internal cavity 158 therein. FIG. 9 generally illustrates a cross-section, a first cross-section, of the first internal cavity 158 (FIG. 10). The first cross-section is generally rectangular and includes an abutting edge 162. The first cross-section has an area that is substantially less than an area of the first outer periphery 154 of the first portion 114. Stated another way, the first portion 114 includes a plate 164 that extends from the top wall 141 such that the area of the first cross-section and the area of the first outer periphery 154 are not equivalent. The abutting edge 162 extends from the generally rectangular potion of the first cross-section in a direction towards the manual pour tube 122. The abutting edge 162 results in the first cross-section being generally shaped like the letter "L" laid on its side, i.e., "L-shaped."

Returning reference to FIG. 10, the first portion 114 of the deaeration tank 110 further includes a plurality of first portion support members 166. In the illustrated embodiment, the first portion support members 166 extend from the first side wall 150 of the first portion 114 to the first portion joining plane A1. The first portion support members 166 have a generally horizontal rectangular cross-section. In the illustrated embodiment, as best illustrated in FIG. 9, the first portion 114 includes six first portion support members 166. The six first portion support members 166 are distributed evenly between the first side 142 and the second side 146 of the deaeration tank 110. Specifically, the six first portion support members 166 are distributed in a grid having two rows and three columns.

Figure 12:
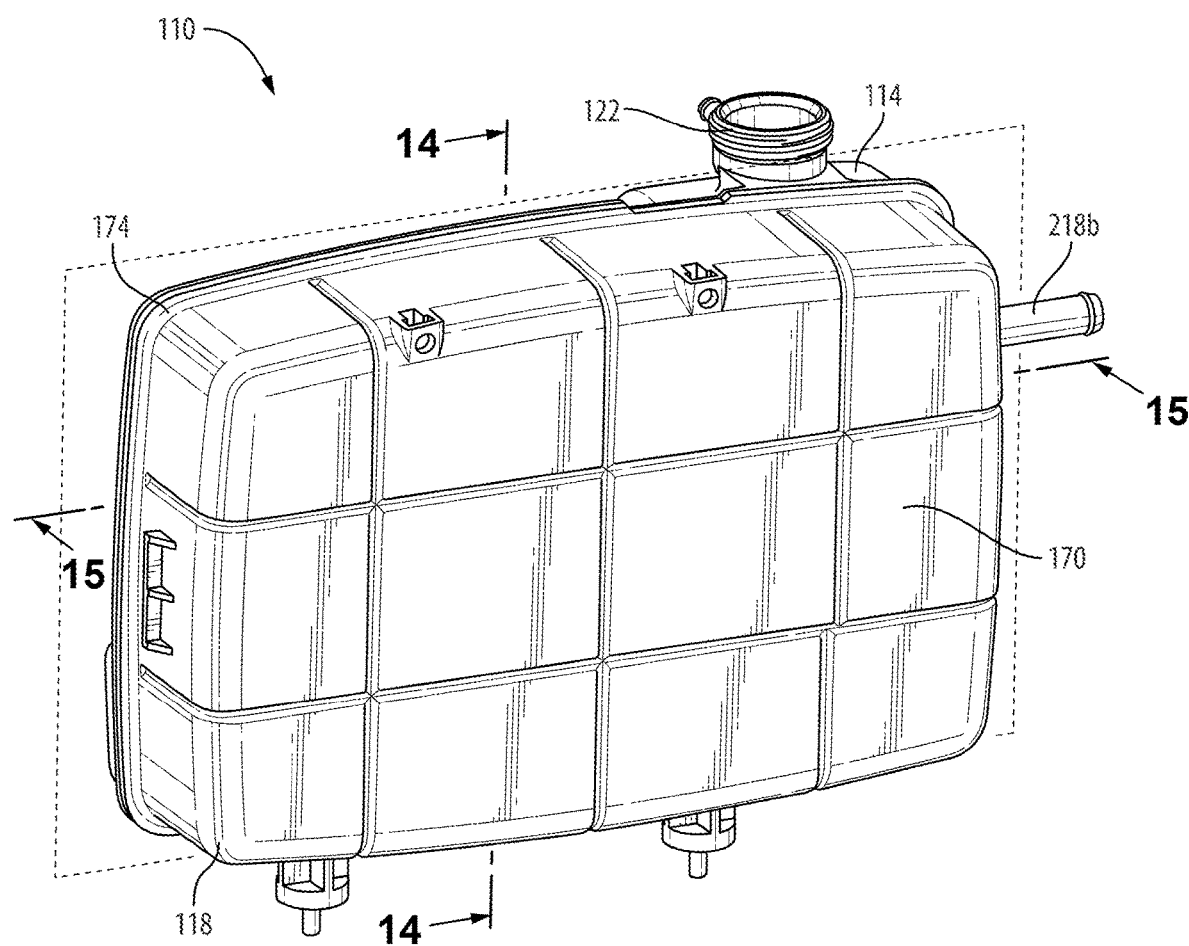
FIG. 12 a rear perspective view of the deaeration tank of FIG. 6.
Figure 13:
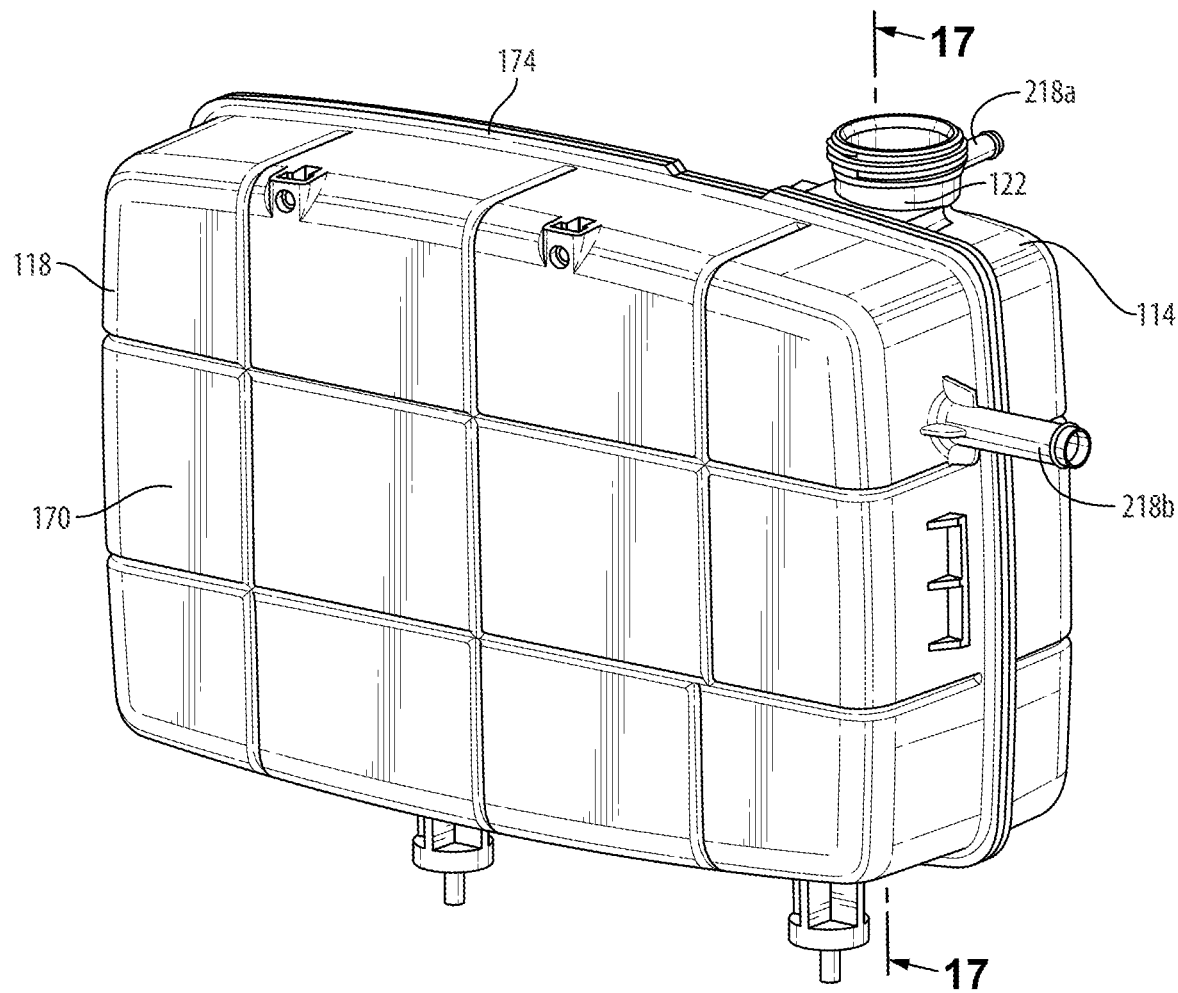
FIG. 13 is another rear perspective view of the deaeration tank of FIG. 6.
Figure 14:
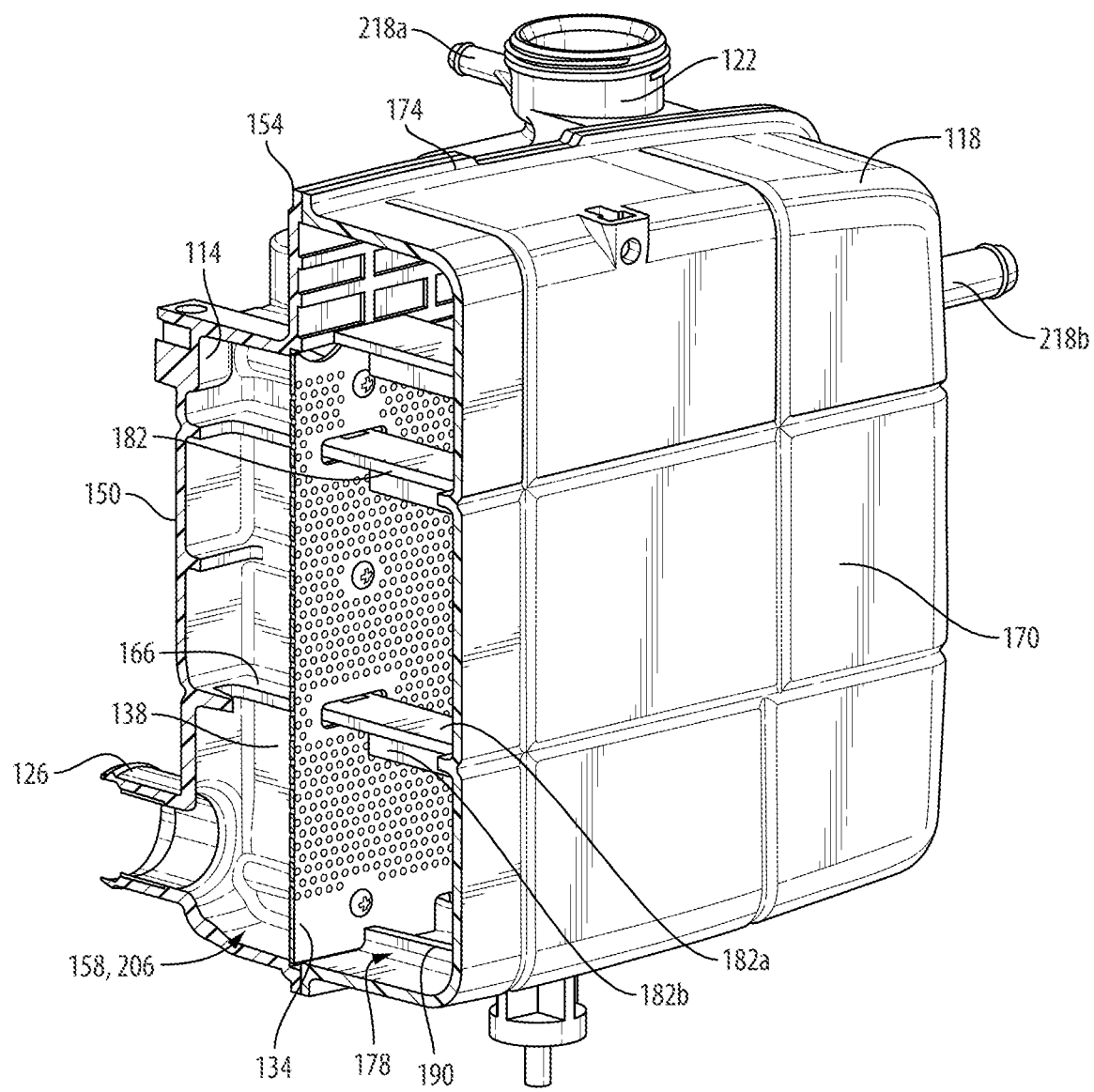
FIG. 14 is a section view of the deaeration tank of FIG. 12 taken along line 14-14.

As illustrated in FIGS. 12-14, the second portion 118 includes a second side wall 170 and a second outer periphery 174 that defines a second portion joining plane A2. When the deaeration tank 110 is assembled, the first portion joining plane A1 and the second portion joining plane A2 define a central plane along an interface between the first portion 114 and the second portion 118. The second side wall 170 is spaced from the second outer periphery 174, thereby defining a second internal cavity 178 therein. The second outer periphery 174 is substantially the same as the first outer periphery 154 of FIG. 7 such that the second outer periphery 174 may be aligned to mate with the first outer periphery 154. The second internal cavity 178 has a generally rectangular cross-section, a second cross-section, and does not include an abutting edge 162. As such, the second cross-section has a different shape than the first cross-section. Stated another way, the first cross-section of the first internal cavity 158 taken along the central plane has a first shape, and the second cross-section of the second internal cavity 174 taken along the central plane has a second shape that is different from the first shape. The second cross-section has an area that is substantially similar to an area of the second outer periphery 174. As such, the area of the second cross-section is greater than the area of the cross-section of the first internal cavity 158. Specifically, the second portion 118 does not include a plate such as plate 164 of FIG. 9.

Figure 15:
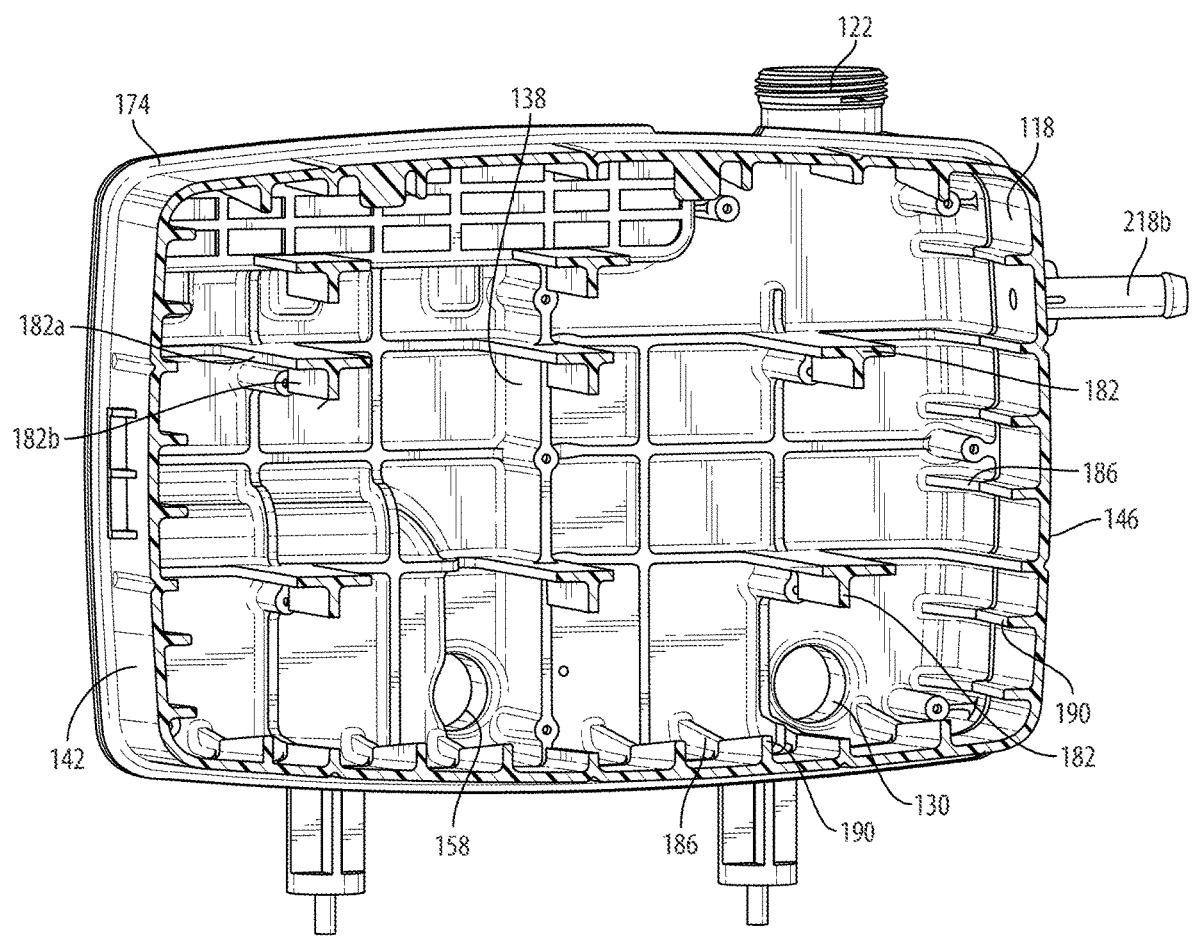
FIG. 15 is a section view of the deaeration tank of FIG. 12 taken along line 15-15.

As best illustrated in FIGS. 14 and 15, the second portion 118 of the deaeration tank 110 further includes a plurality of second portion support members 182. In the illustrated embodiment, the second portion support members 182 extend from the second side wall 170 of the second portion 118 to the second portion joining plane A2. The second portion support members 182 have a generally T-shaped cross-section. In other words, the second portion support members 182 have a first segment 182a and second segment 182b that form the generally T-shaped cross-section. In the illustrated embodiment, when the deaeration tank 110 is in the upright position, the first segment 182a is generally horizontal, and the second segment 182b is generally vertical. The first segment 182a is substantially similar to the cross-section of the first portion support members 166 of FIG. 9 such that the second portion support members 182 may be aligned to mate with the first portion support members 166 (FIG. 9). The second segment 182b extends perpendicularly from the first segment 182a in a direction towards the bottom wall 139 of the deaeration tank 110. Stated another way, the second segment 182b extends perpendicularly from the first segment 182a in a direction away from the top wall 141 of the deaeration tank 110. In the illustrated embodiment, the second segment 182b extends perpendicularly from the first segment 182a. In other embodiments, the second segment 182b may extend at an angle relative to the first segment 182a. In further embodiments, the second segment 182b may curve away from the first segment 182a.

As best illustrated in FIG. 15, the second portion 118 includes eight second portion support members 182. The eight second portion support members 182 are distributed between the first side 142 and the second side 146 of the deaeration tank 110. Specifically, the eight second portion support members 182 are distributed in a grid having three rows and three columns. A row that is closest to the top wall 141 of the deaeration tank 110 only includes two of the second portion support members 182. In other embodiments, the second portion support members 182 may be distributed in other configurations.

Figure 11:
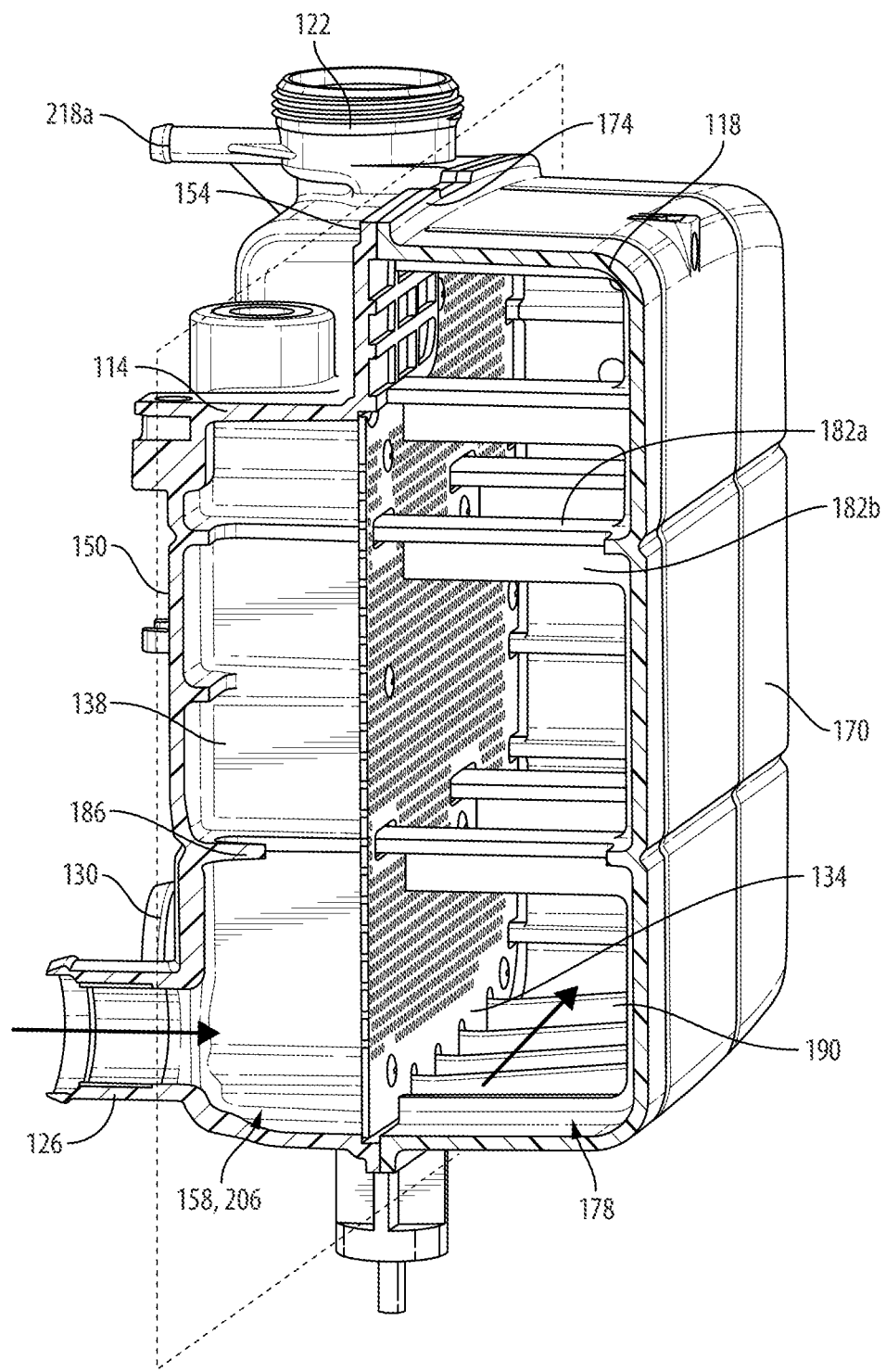
FIG. 11 is another view of the section view of FIG. 10.

As illustrated in FIGS. 11 and 15, the first portion 114 of the deaeration tank 110 additionally includes a plurality of first peripheral supports 186, and the second portion 118 of the deaeration tank 110 additionally includes a plurality of second peripheral supports 190. Each of the first peripheral supports 186 and the second peripheral supports 190 protrude from the bottom wall 139 of the deaeration tank 110.

The first peripheral supports 186 extend along the first portion 114 from the from the first outer periphery 154 to the first side wall 150. The second peripheral supports 190 extend along the second portion 118 from the second outer periphery 174 to the second side wall 170. In the illustrated embodiment, at least one of the first peripheral supports 186 increase in height as the first peripheral supports 186 extend from the first outer periphery 154 to the first side wall 150. That is, the first peripheral supports 186 may be inclined. In the illustrated embodiment, at least one of the second peripheral supports 190 increase in height as the second peripheral supports 190 extend from the second outer periphery 174 to the second side wall 170. That is, the second peripheral supports 190 may be inclined.

Figure 16:
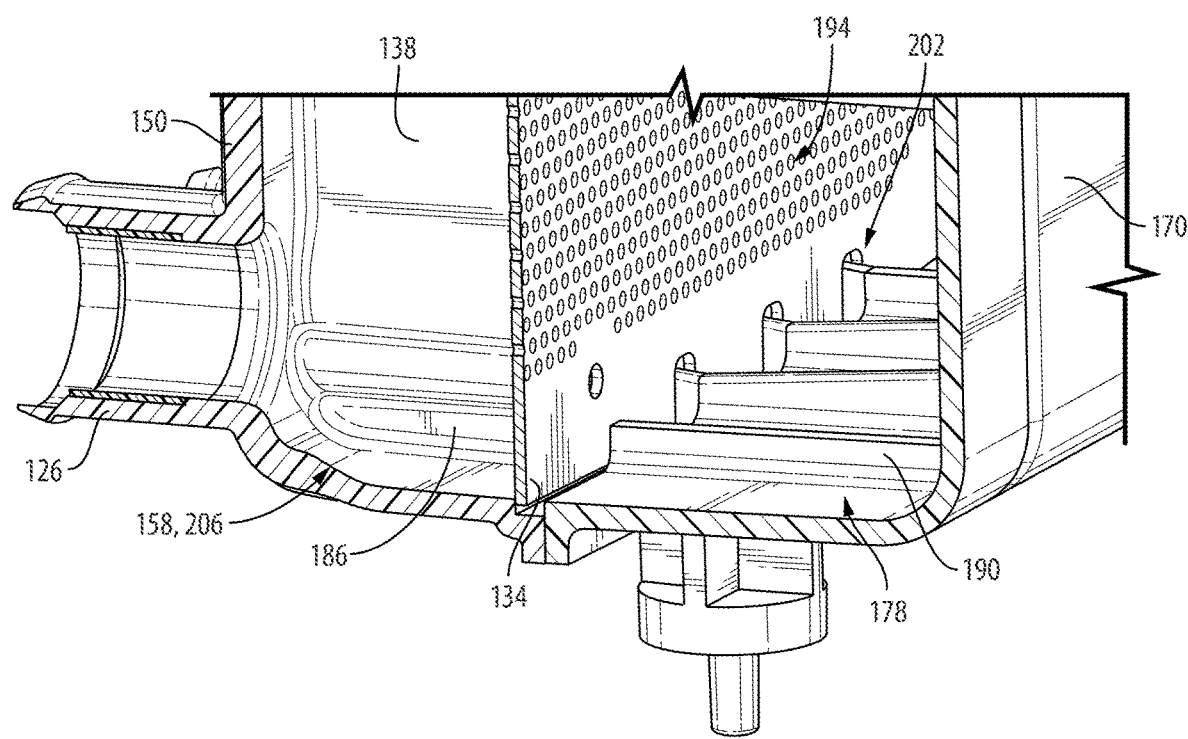
FIG. 16 is a detail view of the section view of the deaeration tank of FIG. 14.

Returning reference to FIG. 9, the filter 134 is a perforated screen including a plurality of apertures 194 extending therethrough. The apertures 194 separate air from coolant flowing through the filter 134. With additional reference to FIG. 16, the filter 134 extends along an interface between the first portion 114 and the second portion 118 of the deaeration tank 110. The filter 134 has substantially the same cross-section as the first internal cavity 158 of the first portion 114 such that the filter 134 is positioned within the first internal cavity 158 in a position recessed from the first portion joining plane A1. When the first portion 114 has been joined to the second portion 118, the filter 134 extends between the first side 142 and the second side 146 of the deaeration tank 110, thereby providing a partition between the first internal cavity 158 and the second internal cavity 178.

With reference to FIGS. 9 and 11, the filter 134 further includes a plurality of internal slots 198 and a plurality of peripheral slots 202. Each of the plurality of internal slots 198 has a cross-section that is substantially similar to the cross-section of the first portion support members 166. As such, each of the first portion support members 166 extend from the first side wall 150 through a corresponding one of the internal slots 198 to the first portion joining plane A1. Each of the plurality of peripheral slots 202 has as cross-section that is substantially similar to the cross-section of the first peripheral supports 186. As such, each of the first peripheral supports 186 extend through a corresponding one of the plurality of peripheral slots 202. The filter 134 may therefore secured in place within the deaeration tank 110 by the first portion support members 166 and the first peripheral supports 186.

Figure 17:
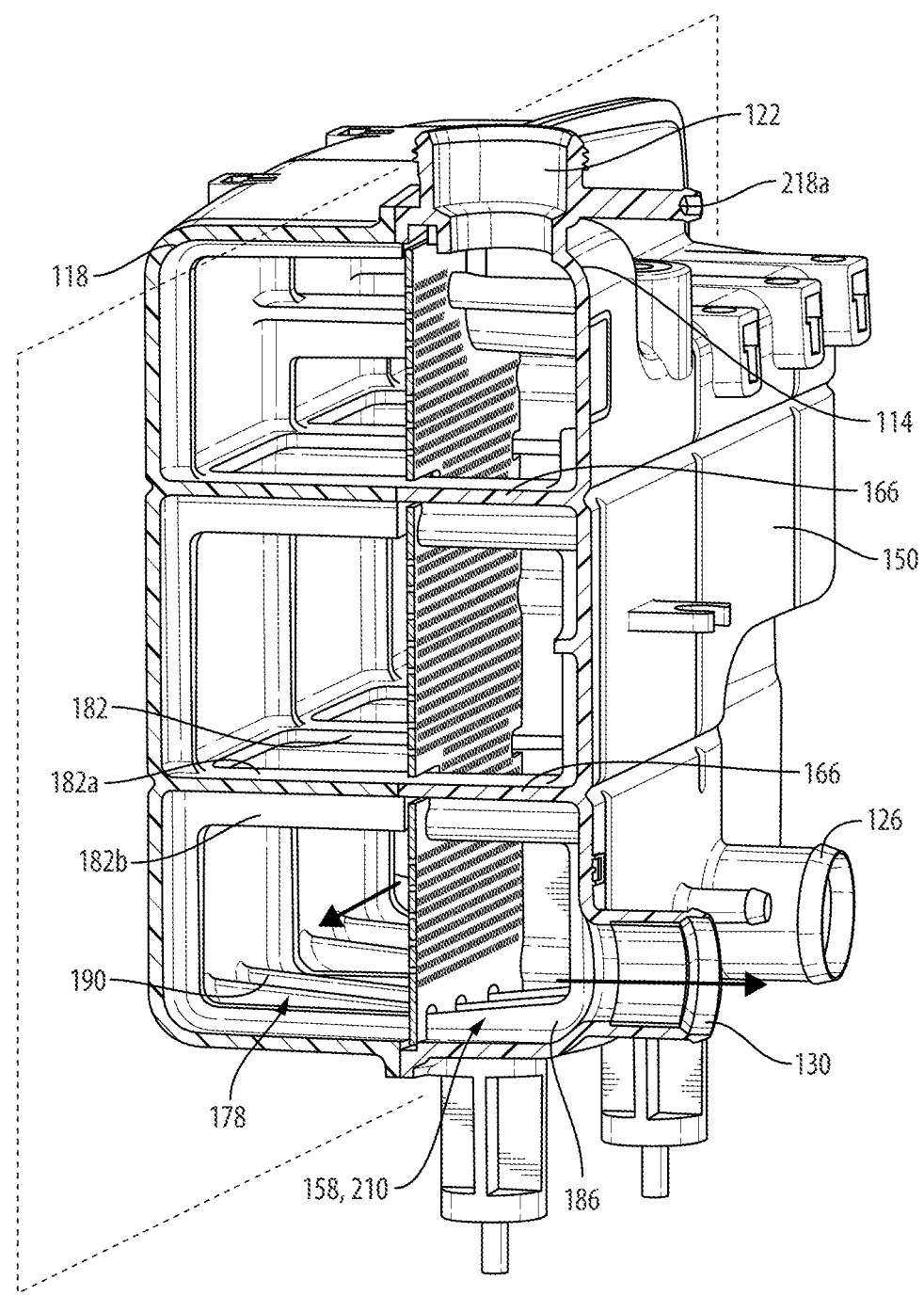
FIG. 17 is a section view of the deaeration tank of FIG. 13 taken along line 17-17.

As illustrated in FIGS. 11 and 17, the baffle 138 is provided in the first internal cavity 158. Specifically, the baffle 138 extends from the first side wall 150 to the filter 134. The baffle 138 is positioned between the inlet tube 126 and the outlet tube 130 such that the baffle 138 divides the first internal cavity 158 into an inlet chamber 206 and an outlet chamber 210. In the illustrated embodiment, the baffle 138 extends perpendicularly to the filter 134. In other embodiments, the baffle 138 may extend at a different angle relative to the filter 134. The baffle 138 is operable to inhibit coolant flowing into the inlet chamber 206 of the deaeration tank 110 from flowing directly to the outlet chamber 210 without first passing through the filter 134. As such, the baffle 138 directs coolant from the inlet chamber 206 to the second internal cavity 178.

Figure 18:
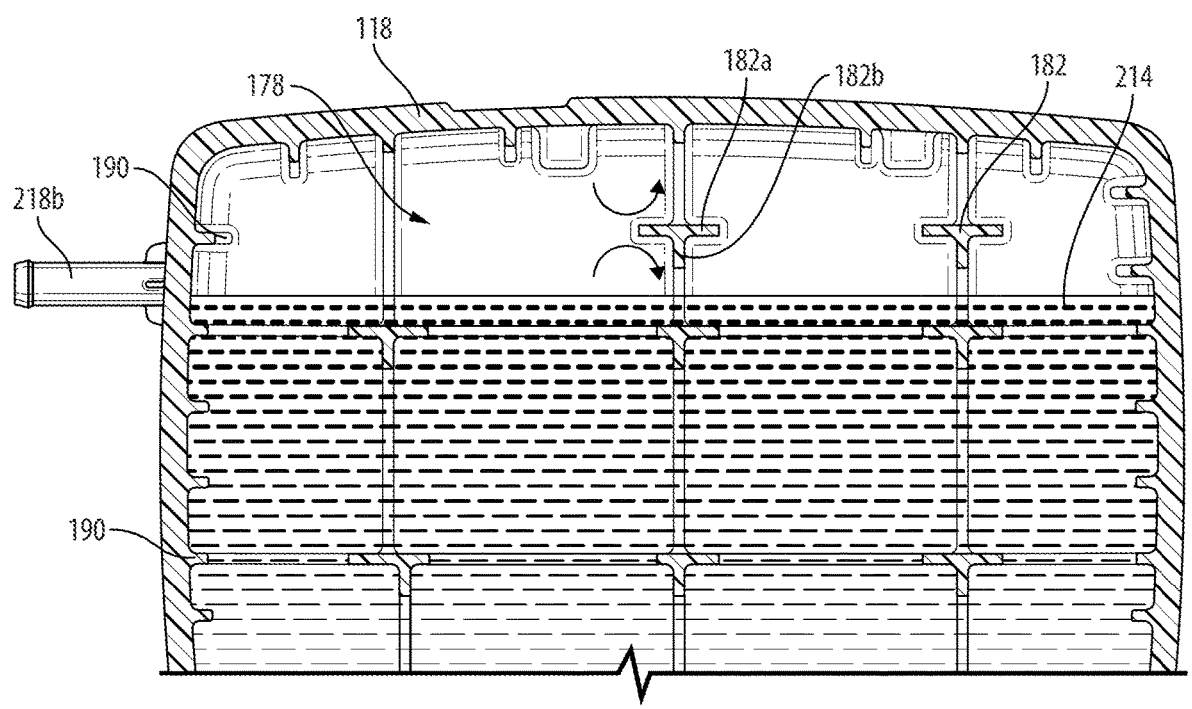
FIG. 18 is a detailed section view of an opposite section from the section view of FIG. 9.

As illustrated in FIG. 18, the deaeration tank 110 further includes a full line 214 and an air vent 218b. The deaeration tank 110 also includes another air vent 218a, which is shown in FIG. 13. The full line 214 denotes a level at which adding further coolant decreases the flow efficiency of the coolant. In other words, flow through the outlet tube 130 may become turbulent. With additional reference to FIG. 13, the air vents 218a, 218b allow air that has been removed from the coolant to escape from the deaeration tank 110. A first air vent 218a extends from the manual pour tube 122. A second air vent 218b extends from the second side 146 of the deaeration tank 110. More specifically, the second air vent 218b is integrally formed with the second portion 118 of the deaeration tank 110 and is positioned above the full line 214. As such, both the first air vent 218a and the second air vent 218b are positioned above the full line 214. In some embodiments, the deaeration tank 110 may include more air vents.

Returning reference to FIGS. 11 and 17, in operation, the deaeration tank 110 may be fluidly connected to an engine or to a battery. A user may fill the deaeration tank 110 through the manual pour tube 122 to supply coolant therein. Once poured through the manual pour tube 122, the coolant directly enters the outlet chamber 210 and flows out of the deaeration tank 110 through the outlet tube 130. The coolant may then flow to the engine to cool down the engine and then eventually return to the deaeration tank 110. Coolant flowing from the engine enters the deaeration tank 110, and more specifically, enters the inlet chamber 206, through the inlet tube 126. The baffle 138 inhibits the coolant from flowing directly from the inlet chamber 206 to the outlet chamber 210. The coolant is instead directed to flow along a first fluid flow path P1. The first fluid flow path P1 directs coolant to flow from the inlet chamber 206 to the second internal cavity 178 by passing through the filter 134, thereby de-aerating the coolant. Air that has been removed from the coolant rises above the coolant level in the deaeration tank 110. The air may then escape from the deaeration tank 110 through the first air vent 218a or the second air vent 218b (FIG. 18). As the coolant begins to flow through the second internal cavity 178, the geometry of the second portion support members 182 reduces an amount of coolant being sprayed above the full line 214 by the geometry of the second portion support members 182. More specifically, the intersection between the first segment 182a and the second segment 182b of the second portion support members 182 directs the coolant in a direction toward the bottom wall 139 of the deaeration tank 110, thereby reducing air entrainment into the coolant caused by turbulent flow of coolant around the second portion support members 182. The coolant is then be directed to flow along a second fluid flow path P2. The second fluid flow path P2 directs coolant to flow from the second internal cavity 178 to the outlet chamber 210 through the filter 134, thereby de-aerating the coolant again. Once the coolant reaches the outlet chamber 210, the coolant flows out of the outlet tube 130 back to the engine to cool down the engine.

The deaeration tank 110 of FIGS. 6-18 includes numerous de-aerating structures that result in de-aeration of the fluid passing through the deaeration tank 110. Specifically, the positioning of the filter 134 causes coolant flowing through the deaeration tank 110 to undergo de-aeration at least twice. Additionally, the air that has been removed from the coolant is then inhibited from rejoining the coolant by the second portion support members 182. Specifically, the second portion support members 182 direct coolant away from the top wall 141 of the deaeration tank 110 where removed air is located prior to being removed from the deaeration tank 110 through the air vents 218a, 218b. As such, the deaeration tank 110 of FIGS. 6-18 is operable to de-aerate the coolant more efficiently than the deaeration tank 10 of FIGS. 1-5 and results in an increased lifespan of the engine or battery associated with the deaeration tank 110.

Figure 19:
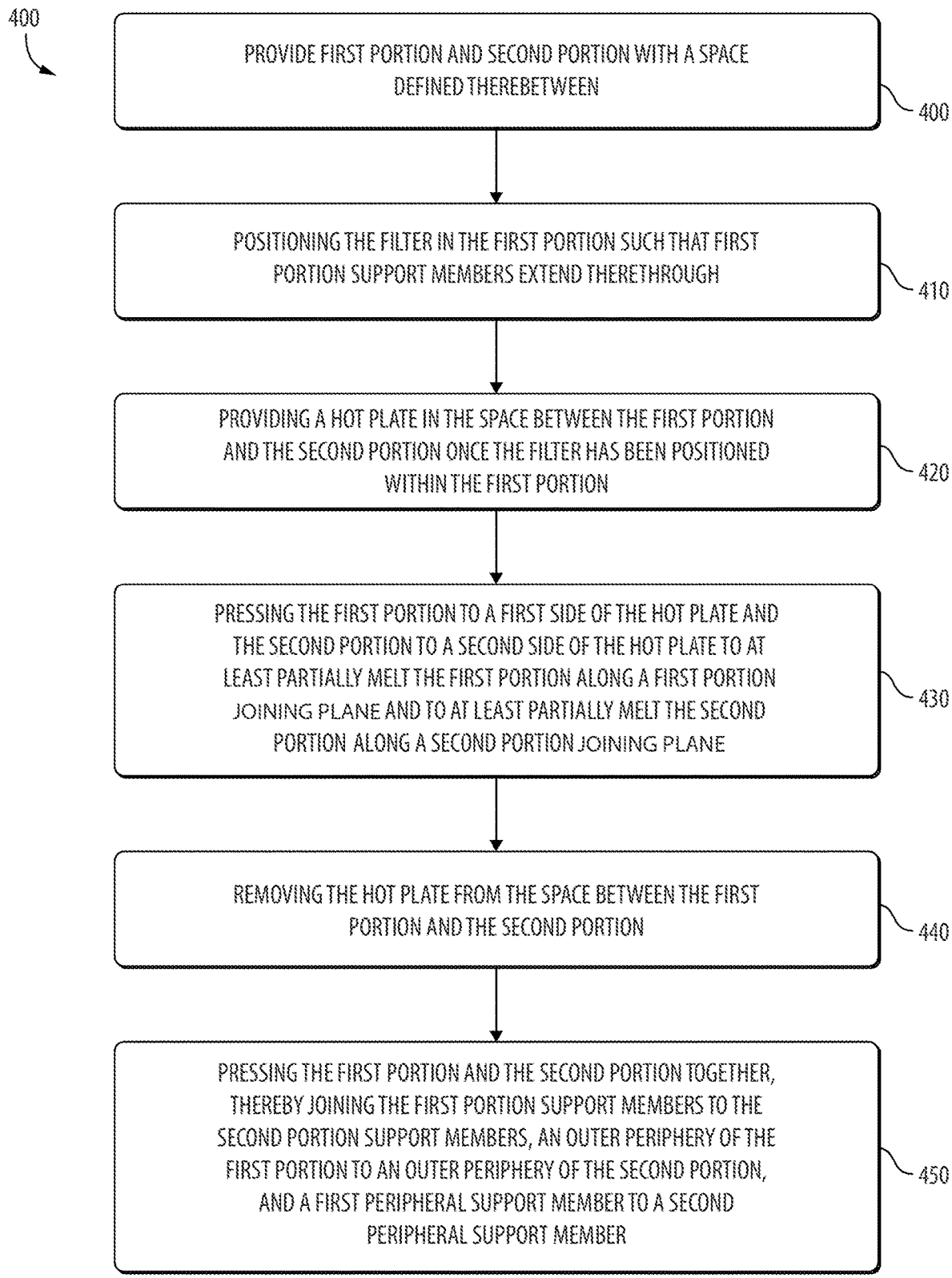
FIG. 19 is a schematic of a method for manufacturing the deaeration tank of FIG. 6.

FIG. 19 illustrates a method 400 for producing the deaeration tank 110 of FIGS. 6-18. Although the method 400 is described with reference to certain steps, not all of the steps need to be performed or need to be performed in the order presented.

Figure 20:
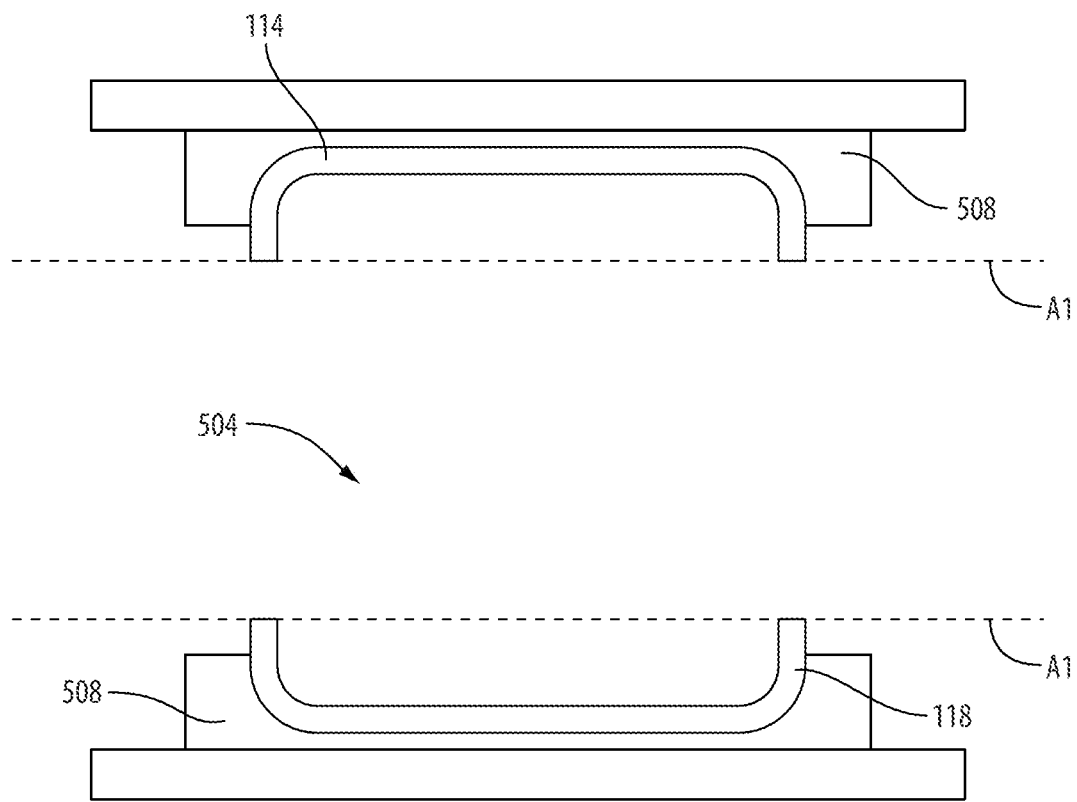
FIG. 20 is a schematic view of a first step of manufacturing the deaeration tank of FIG. 6.

At step 410, with additional reference to FIG. 20, the method 400 includes providing the first portion 114 and the second portion 118 of the deaeration tank 110 separated by a space 504. The first portion 114 and the second portion 118 may be provided on movable members 508 that allow for motion in a single direction (i.e., a single degree of freedom).

At step 420, with additional reference to FIG. 11, the method 400 includes positioning the filter 134 within the first internal cavity 158 of the first portion 114 such that the first portion support members 166 and the first peripheral supports 186 at least partially extend through the filter 134. The filter 134 is positioned within the first internal cavity 158 partially recessed from the first portion joining plane A1.

Figure 21:
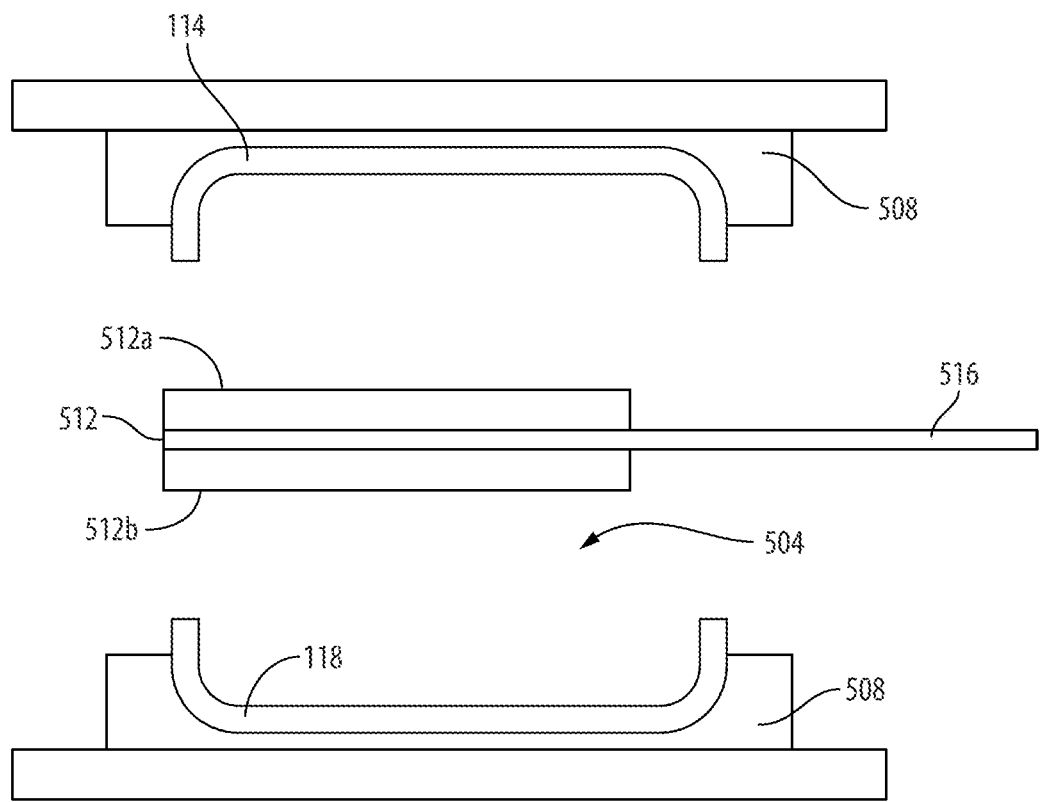
FIG. 21 is a schematic view of a second step of manufacturing the deaeration tank of FIG. 6.

At step 430, with additional referencing to FIG. 21, the method 400 is described using hot plate welding. In some embodiments, the method 400 may not include hot plate welding. In such embodiments, the first portion 114 and the second portion 118 may be joined together through manufacturing processes such as, but not limited to, gluing, ultrasonic welding, friction welding, solvent welding, and the like. When used, the hot plate welding method includes providing a hot plate 512 in the space 504 between the first portion 114 and the second portion 118 once the filter 134 has been positioned in the first internal cavity 158 (FIG. 11). The hot plate 512 may be provided in the space 504 at a temperature range of 220 to 932 degrees Fahrenheit (i.e., ~104 to ~500 degrees Celsius). The hot plate 512 may be held in the space 504 between the first portion 114 and the second portion 118 by tongs 516 or another similar utensil.

At step 440, with continued reference to FIGS. 19 and 21, the method 400 includes pressing the first portion 114 to a first side 512a of the hot plate 512 and the second portion 118 to a second side 512b of the hot plate 512 to partially melt the first portion 114 along the first portion joining plane A1 and to melt the second portion 118 along the second portion joining plane A2. The movable members 508 may be moved to bring the first portion 114 and the second portion 118 into engagement with the hot plate 512. With reference to FIGS. 14 and 21, when the first portion 114 engages the first side 512a of the hot plate 512, the first outer periphery 154, the first portion support members 166, and the first peripheral supports 186 begin to melt. When the second portion 118 engages the second side 512b of the hot plate 512, the second outer periphery 174, the second portion support members 182, and the second peripheral supports 190 begin to melt.

At step 450, returning reference to FIGS. 19 and 21, the method 400 includes removing the hot plate 512 from the space 504 between the first portion 114 and the second portion 118. Once the first portion 114 and the second portion 118 have been sufficiently melted, the hot plate 512 is removed from the space 504.

At step 460, the method 400 includes pressing the first portion 114 and the second portion 118 together to join the first portion supports 166 to the second portion supports 182, the first outer periphery 154 to the second outer periphery 174, and the first peripheral supports 186 to the second peripheral supports 190. Once the first portion 114 and the second portion 118 have been pressed together, melted ends of the first portion 114 and the second portion 118 cool together such that the first portion 114 and the second portion 118 are joined to form the deaeration tank 110.

Figure 22A:
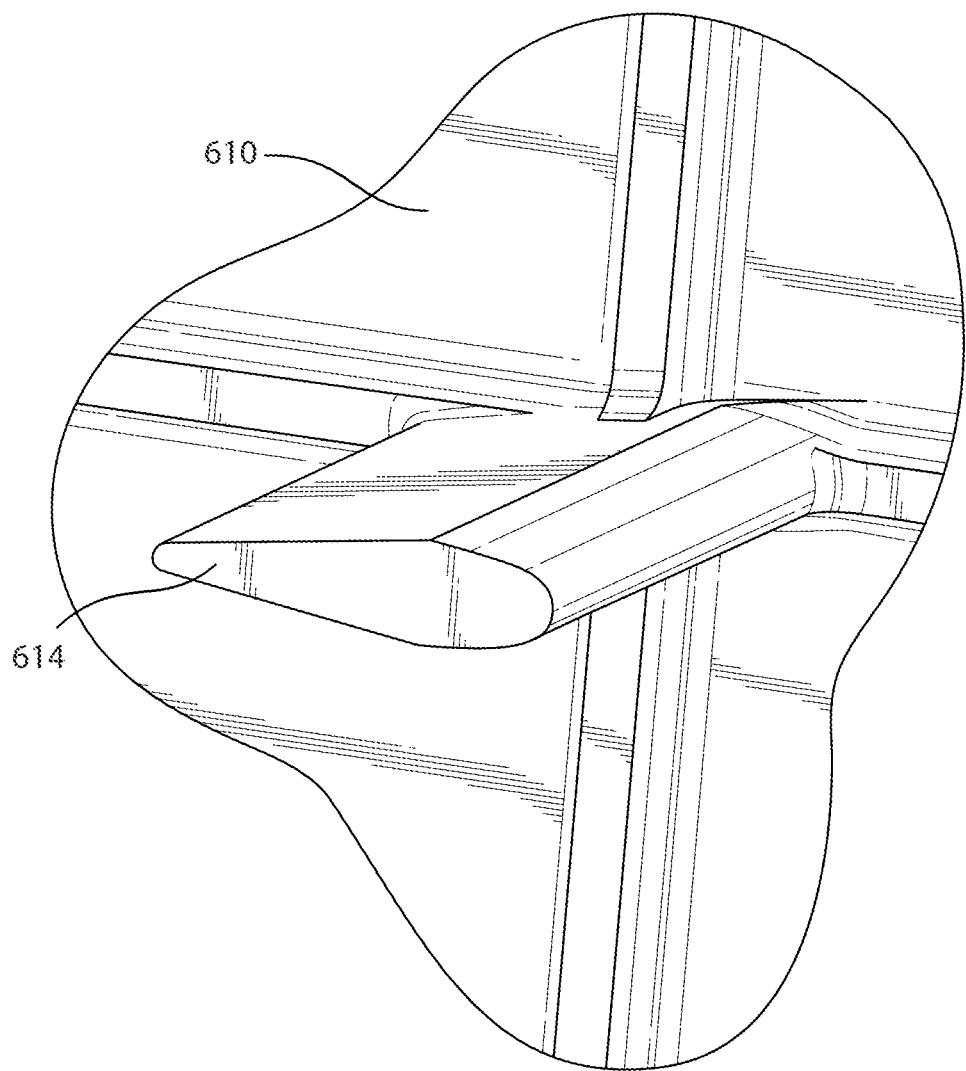
FIG. 22A is a perspective view of a support member for a deaeration tank according to another embodiment of the disclosure.

FIG. 22A illustrates a portion of another embodiment of a deaeration tank 610. The deaeration tank 610 of FIG. 22A is substantially similar to the deaeration tank 110 of FIG. 6. As such, only the differences between the deaeration tank 610 of FIG. 22A and the deaeration tank 110 of FIG. 6 are described herein. FIG. 22A illustrates a second portion support member 614 for the deaeration tank 610. The second portion support member 614 is wing-shaped and extends horizontally. The second portion support member 614 does not include a vertical portion. Similarly to the second portion support members 182 of FIG. 15, the wing-shaped second portion support member 614 may also direct coolant away from a top wall of the deaeration tank 610 to inhibit air from rejoining the coolant. Although only one second portion support member 614 is illustrated in FIG. 22A, the deaeration tank 610 includes eight wing-shaped second portion support members 614. Although first portion support members are not illustrated in FIG. 22A, the deaeration tank 610 includes eight wing-shaped first portion support members that are joined to the second portion support members 614.

Figure 22B:
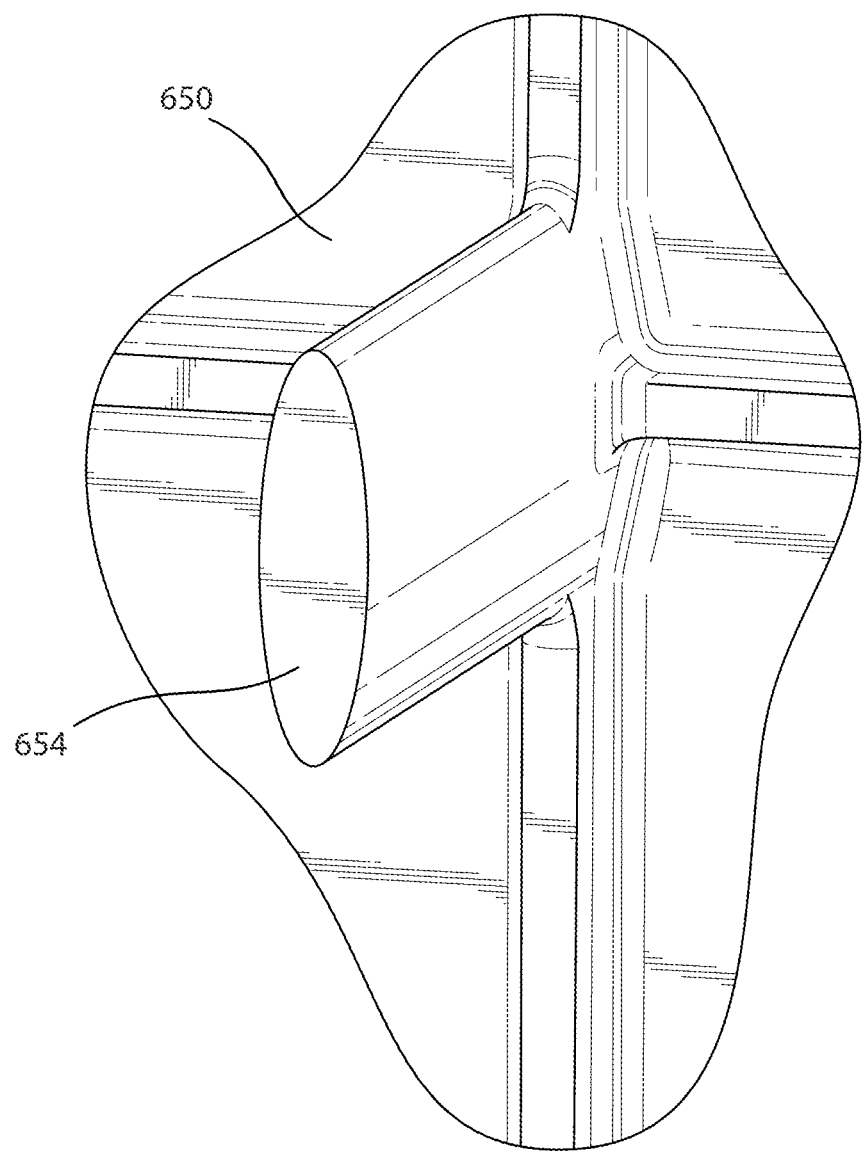
FIG. 22B is a perspective view of a support member for a deaeration tank according to another embodiment of the disclosure.

FIG. 22B illustrates a portion another embodiment of a deaeration tank 650. The deaeration tank 650 of FIG. 22B is substantially similar to the deaeration tank 110 of FIG. 6. As such, only the differences between the deaeration tank 650 of FIG. 22B and the deaeration tank 110 of FIG. 6 are described herein. FIG. 22B illustrates a second portion support member 654 for the deaeration tank 650. The second portion support member 654 is obround and extends vertically. The second portion support member 654 does not include a horizontally extending portion. Similarly to the second portion support members 182 of FIG. 15, the obround-shaped second portion support member 654 may also direct coolant away from a top wall of the deaeration tank 650 to inhibit air from rejoining the coolant. Although only one second portion support 654 is illustrated in FIG. 22B, the deaeration tank 650 includes eight obround-shaped second portion support members 654. Although first portion support members are not illustrated in FIG. 22b, the deaeration tank 650 includes eight obround-shaped first portion support members that are joined to the second portion support members 654.

Figure 22C:
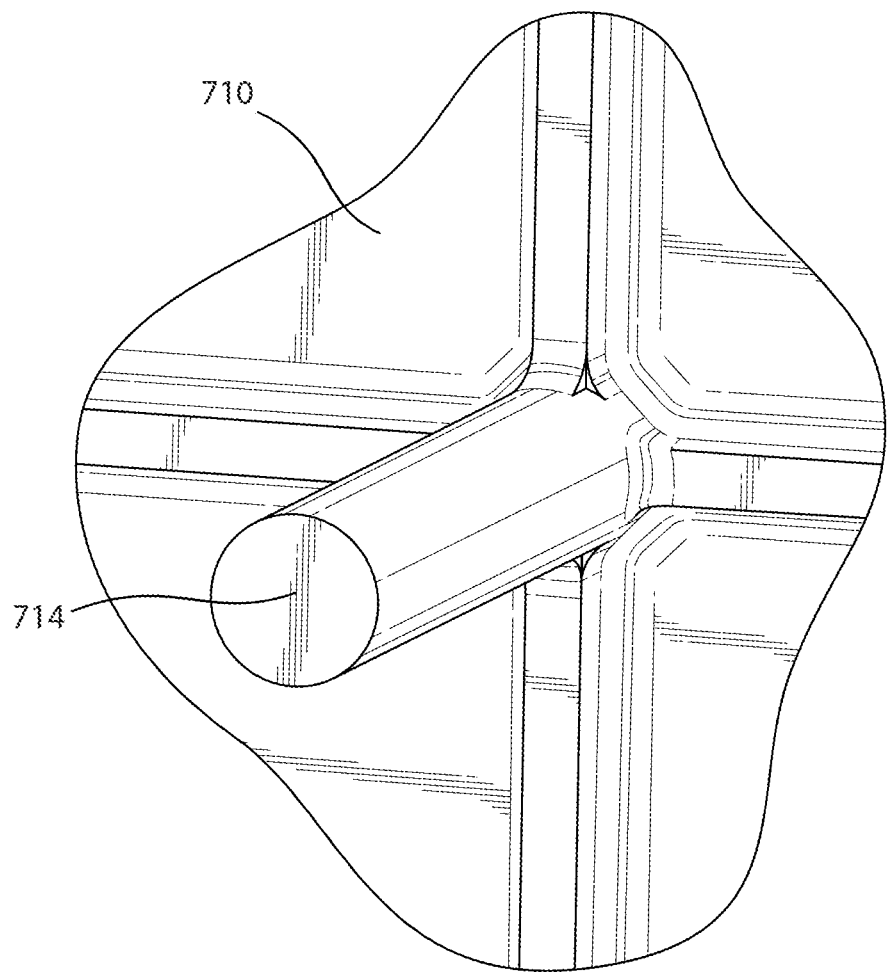
FIG. 22C is a perspective view of a support member for a deaeration tank according to another embodiment of the disclosure.

FIG. 22C illustrates a portion of another embodiment of a deaeration tank 710. The deaeration tank 710 of FIG. 22C is substantially similar to the deaeration tank 110 of FIG. 6. As such, only the differences between the deaeration tank 710 of FIG. 22C and the deaeration tank 110 of FIG. 6 are described herein. FIG. 22C illustrates a second portion support member 714 for the deaeration tank 710. The second portion support member 714 is circular. Similarly to the second portion support members 182 of FIG. 15, the circular second portion support member 714 may also direct coolant away from a top wall of the deaeration tank 710 to inhibit air from rejoining the deaeration tank 710. Although only one second portion support 714 is illustrated in FIG. 22C, the deaeration tank 710 includes eight circular second portion support members 714. Although first portion support members are not illustrated in FIG. 22C, the deaeration tank 710 includes eight circular first portion support members that are joined to the second portion support members 714.

Figure 22D:
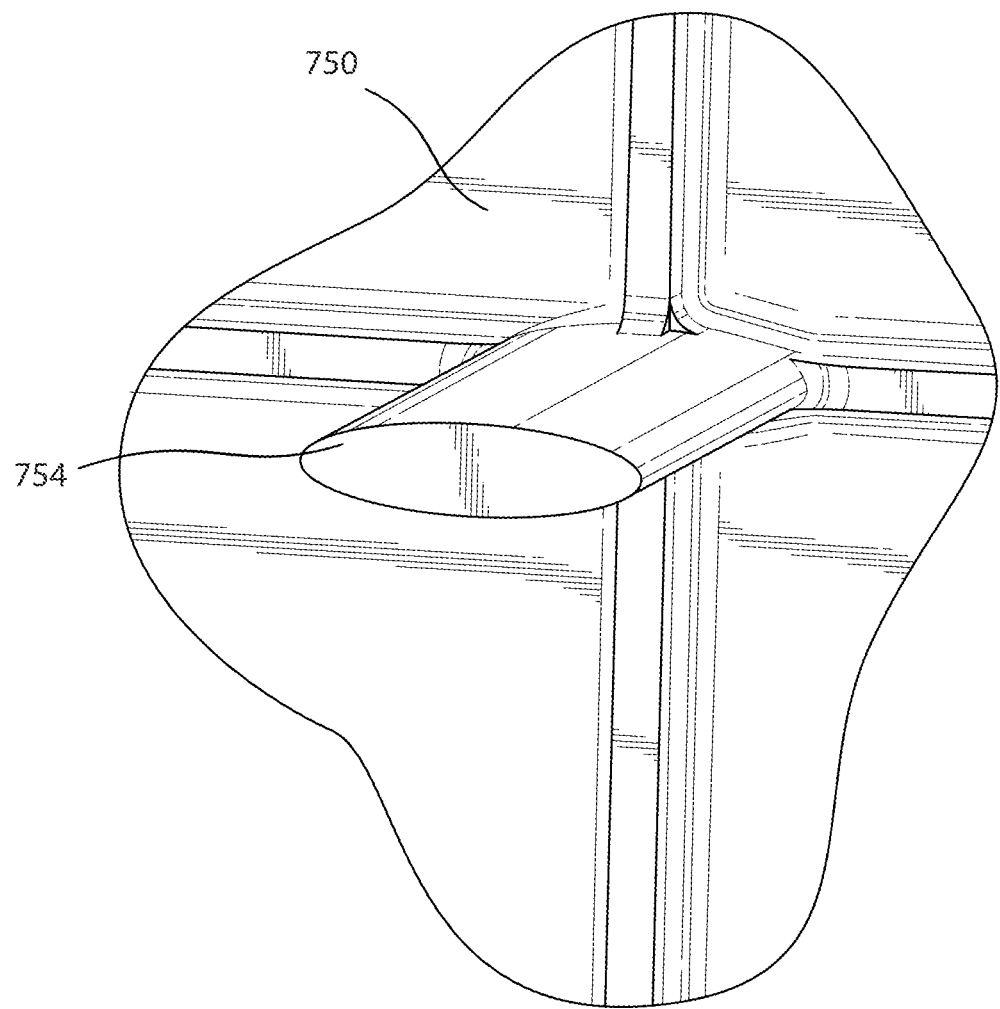
FIG. 22D is a perspective view of a support member for a deaeration tank according to another embodiment of the disclosure.

FIG. 22D illustrates a portion another embodiment of a deaeration tank 750. The deaeration tank 750 of FIG. 22D is substantially similar to the deaeration tank 110 of FIG. 6. As such, only the differences between the deaeration tank 750 of FIG. 22D and the deaeration tank 110 of FIG. 6 are described herein. FIG. 22D illustrates a second portion support member 754 for the deaeration tank 750. The second portion support member 754 is obround and extends horizontally. The second portion support member 754 does not include a vertically extending portion. Similarly to the second portion support members 182 of FIG. 15, the obround-shaped second portion support member 754 may also direct coolant away from a top wall of the deaeration tank 750 to inhibit air from rejoining the coolant. Although only one second portion support 754 is illustrated in FIG. 22D, the deaeration tank 750 includes eight circular second portion support members 754. Although first portion support members are not illustrated in FIG. 22D, the deaeration tank 750 includes eight obround-shaped first portion support members that are joined to the second portion support members 754.

Although not specifically shown herein, the deaeration tank 110 of FIG. 6 could include any combination of support members as shown in FIGS. 15 and 22A-22D. For example, if a hypothetical deaeration tank includes 10 support members, two of the support members are the second portion support members 182 as shown in FIG. 15; two of the support members are the second portion support members 614 as shown in FIG. 22A; two of the support members are the second portion support members 654 as shown in FIG. 22B; two of the support members are the second portion support members 714 as shown in FIG. 22C; and two of the support members are the second portion support members 754 as shown in FIG. 22D. This hypothetical example is not limiting, as other numbers of and combinations of support members are contemplated.

Figure 23:
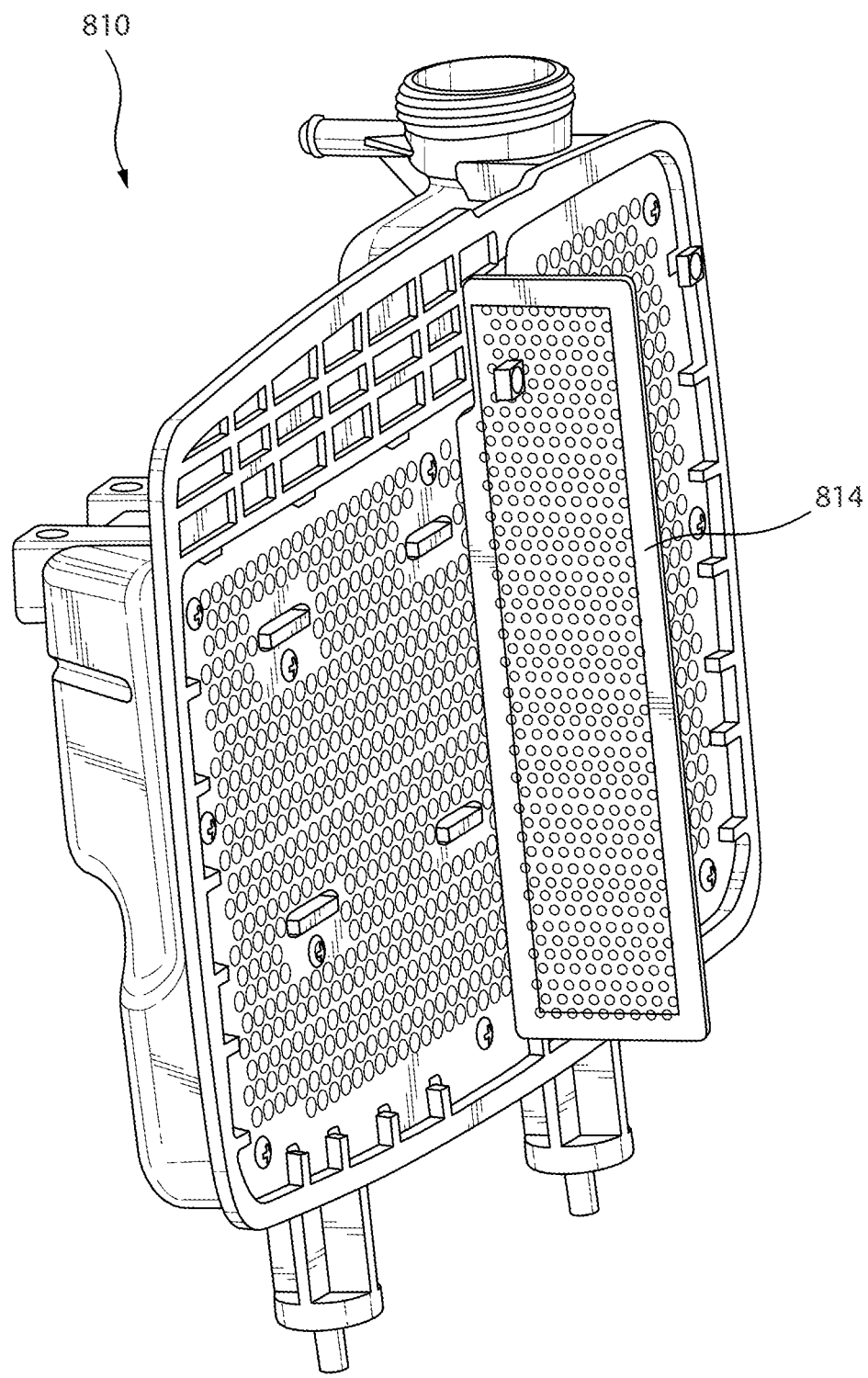
FIG. 23 is a perspective view of a portion of a deaeration tank according to another embodiment of the disclosure.

FIG. 23 illustrates a portion of another embodiment of a deaeration tank 810. The deaeration tank 810 of FIG. 23 is substantially similar to the deaeration tank 110 of FIG. 6. As such, only the differences between the deaeration tank 810 of FIG. 23 and the deaeration tank 110 of FIG. 6 are described herein. The deaeration tank 810 includes a perforated baffle 814 that extends through a second internal cavity defined by a second portion of the deaeration tank 810. Although the second internal cavity and the second portion are not illustrated in FIG. 23, the second internal cavity and the second portion are substantially similar to the second internal cavity 178 and the second portion 118 of FIG. 17, respectively. The deaeration tank 810 has substantially the same coolant flow path as the deaeration tank 110 of FIG. 6. As such, as coolant flows along the coolant flow path, the coolant flows through the perforated baffle 814, thereby providing an additional means for de-aerating the coolant such that the deaeration tank 810 has three de-aerating means along the coolant flow path.

Although the invention has been described with reference to certain embodiments, variations and modifications exist within the spirit and scope of the invention. Various features of the invention are set forth in the following claims.

What is claimed is:

1. A deaeration tank configured to de-aerate coolant fluid for an electric vehicle, the deaeration tank comprising:
    a housing including:
        a first portion having a first cavity, a plurality of first portion support members, and a baffle that divides the first cavity into an inlet chamber and an outlet chamber,
        a second portion having a second cavity and a plurality of second portion support members, and
        a fluid flow path extending from the inlet chamber to the second cavity and from the second cavity to the outlet chamber; and
    a filter configured to separate air from coolant fluid flowing through the filter, the filter extending along an interface between the first portion and the second portion;
    wherein the filter:
        (i) separates the second cavity from the inlet chamber such that the fluid flow path passes though the filter a first time, and
        (ii) separates the second cavity from the outlet chamber such that the fluid flow path passes through the filter a second time;
    wherein the first portion is joined to the second portion such that ends of the first portion support members are joined with ends of the second portion support members,
    wherein each of the second portion support members is configured to direct coolant fluid toward a bottom of the housing to reduce air entrainment of the coolant fluid
    wherein, one of the first portion support members and the second portion support members, in cross section, includes a first segment and a second segment that extends perpendicularly from the first segment,
    wherein, in use, the second segment extends perpendicularly from the first segment in a direction towards a bottom of the housing, and
    wherein the first segment and the second segment form a T-shape in the cross section.

2. The deaeration tank of claim 1, wherein the first portion support members or the second portion support members extend through the filter.

3. The deaeration tank of claim 1, wherein the first portion and the second portion are made of plastic and formed through injection molding, and wherein the first portion is joined to the second portion through hot plate welding.

4. The deaeration tank of claim 1, wherein the filter is a perforated screen including a plurality of apertures that is configured to de-aerate the coolant fluid as the coolant fluid flows through the apertures.

5. The deaeration tank of claim 4, further comprising an air vent in at least one of the outlet chamber and the second portion, the air vent for removing air from removed from the fluid as a result of the apertures de-aerating the fluid flowing through the apertures.

6. The deaeration tank of claim 1, wherein the interface between the first portion and the second portion defines a central plane of the deaeration tank, wherein a first cross-section of the first cavity taken along the central plane has a first shape, and wherein a second cross-section of the second cavity taken along the central plane has a second shape that is different from the first shape.

7. The deaeration tank of claim 6, wherein the filter is positioned in the first portion and has substantially the same cross-sectional shape as the first shape of the first cross-section of the first cavity.

8. The deaeration tank of claim 6, wherein the second shape is greater in area than the first shape.

9. A method of forming the deaeration tank according to claim 1, the method comprising
    providing the first portion and the second portion with a space defined therebetween,
    positioning the filter within the first portion such that the first portion support members extend therethrough,
    providing a hot plate in the space between the first portion and the second portion after the filter has been positioned within the first portion, pressing the first portion to a first side of the hot plate and the second portion to a second side of the hot plate to at least partially melt the first portion along a first portion joining plane and to at least partially melt the second portion along a second portion joining plane, removing the hot plate from the space between the first portion and the second portion, and pressing the first portion and the second portion together, thereby joining the first portion support members to the second portion support members and joining an outer periphery of the first portion to an outer periphery of the second portion.

10. The deaeration tank of claim 1, wherein the housing includes
a top wall;
a bottom wall;
a first side wall extending between the top wall and the bottom wall;
a second side wall extending between the top wall and the bottom wall opposite from the first side wall;
a fluid inlet positioned closer to the bottom wall than the top wall, the fluid inlet providing an entrance for fluid to flow into the inlet chamber; and
a fluid outlet positioned closer to the bottom wall than the top wall, the fluid outlet providing an exit for fluid to flow out of the outlet chamber.

11. The deaeration tank of claim 10, wherein the first portion support members extend from the first side wall to a center plane of the deaeration tank, and wherein the second portion support members extend from the second side wall to the center plane of the deaeration tank to contact the first portion support members.

12. The deaeration tank of claim 11, wherein the filter extends between the top wall and the bottom wall, and wherein only one of the first portion support members and the second portion support members extends through the filter to the center plane.

13. The deaeration tank of claim 10, wherein the filter extends between the top wall and the bottom wall, and wherein only one of the first segment and the second segment extends through the filter.

14. The deaeration tank of claim 10, wherein the first and second portion support members are distributed across a grid including at least three rows and at least three columns.

15. The deaeration tank of claim 10, wherein the fluid inlet is a first fluid inlet, the deaeration tank further comprising a second fluid inlet that extends through the top wall.

16. A deaeration tank comprising:
a housing including:
a first portion having a first cavity, a plurality of first portion support members, and a baffle that divides the first cavity into an inlet chamber and an outlet chamber,
a second portion having a second cavity and a plurality of second portion support members, and
a fluid flow path extending from the inlet chamber to the second cavity and from the second cavity to the outlet chamber; and
a filter configured to separate air from coolant fluid flowing through the filter, the filter extending along an interface between the first portion and the second portion;
wherein the filter:
(i) separates the second cavity from the inlet chamber such that the fluid flow path passes though the filter a first time, and
(ii) separates the second cavity from the outlet chamber such that the fluid flow path passes through the filter a second time;
wherein the first portion is joined to the second portion such that ends of the first portion support members are joined with ends of the second portion support members,
wherein each of the second portion support members is configured to direct coolant fluid toward a bottom of the housing to reduce air entrainment of the coolant fluid,
wherein, one of the first portion support members and the second portion support members, in cross section, includes a first segment and a second segment that extends perpendicularly from the first segment, and
wherein only one of the first segment and the second segment extends through the filter.

17. The deaeration tank of claim 16, wherein the first portion and the second portion are made of plastic and formed through injection molding, and wherein the first portion is joined to the second portion through hot plate welding.

18. The deaeration tank of claim 16, wherein the filter is a perforated screen including a plurality of apertures that is configured to de-aerate the coolant fluid as the coolant fluid flows through the apertures.

19. The deaeration tank of claim 16, wherein the interface between the first portion and the second portion defines a central plane of the deaeration tank, wherein a first cross-section of the first cavity taken along the central plane has a first shape, and wherein a second cross-section of the second cavity taken along the central plane has a second shape that is different from the first shape.

20. The deaeration tank of claim 19, wherein the filter is positioned in the first portion and has substantially the same cross-sectional shape as the first shape of the first cross-section of the first cavity.

* * * * *